United States Patent
Cypher et al.

(10) Patent No.: US 7,698,504 B2
(45) Date of Patent: Apr. 13, 2010

(54) CACHE LINE MARKING WITH SHARED TIMESTAMPS

(75) Inventors: Robert E. Cypher, Saratoga, CA (US); Shailender Chaudhry, San Francisco, CA (US)

(73) Assignee: Oracle America, Inc., Redwood Shores, CA (US)

( * ) Notice: Subject to any disclaimer, the term of this patent is extended or adjusted under 35 U.S.C. 154(b) by 464 days.

(21) Appl. No.: 11/773,158

(22) Filed: Jul. 3, 2007

(65) Prior Publication Data

US 2009/0013133 A1    Jan. 8, 2009

(51) Int. Cl.
*G06F 15/167* (2006.01)
(52) U.S. Cl. .................. 711/130; 711/122; 711/145
(58) Field of Classification Search .......... 711/122, 711/130, 141, 145
See application file for complete search history.

(56) References Cited

U.S. PATENT DOCUMENTS

| | | | | |
|---|---|---|---|---|
| 6,763,433 | B1 * | 7/2004 | Arimilli et al. | 711/146 |
| 7,464,161 | B2 * | 12/2008 | Chagoly et al. | 709/224 |
| 2007/0130426 | A1 * | 6/2007 | Utsumi | 711/130 |
| 2007/0198781 | A1 * | 8/2007 | Dice et al. | 711/145 |
| 2007/0239942 | A1 * | 10/2007 | Rajwar et al. | 711/147 |
| 2008/0163220 | A1 * | 7/2008 | Wang et al. | 718/101 |

* cited by examiner

*Primary Examiner*—Matt Kim
*Assistant Examiner*—Hal Schnee
(74) *Attorney, Agent, or Firm*—Park, Vaughan & Fleming LLP

(57) ABSTRACT

Embodiments of the present invention provide a system that marks cache lines using shared timestamps. During operation, the system starts a transaction for a thread, wherein starting the transaction involves recording the value of an active timestamp and incrementing a transaction or overflow counter (TO_counter) corresponding to the recorded value. The system then places load-marks on cache lines which are loaded during the transaction. While placing the load-marks, the system writes the recorded value into metadata corresponding to the cache lines. Upon completing the transaction for the thread, the system decrements the TO_counter corresponding to the recorded value and resumes non-transactional execution for the thread without removing the load-marks from cache lines which were load-marked during the transaction.

19 Claims, 12 Drawing Sheets

CACHE LINE MARKING WITH SHARED TIMESTAMPS

BACKGROUND

1. Field of the Invention

Embodiments of the present invention relate to computer systems. More specifically, embodiments of the present invention relate to a technique for cache line marking with shared timestamps within a computer system.

2. Related Art

Transactional memory is a useful programming abstraction that helps programmers write parallel programs that function correctly and helps compilers automatically parallelize sequential threads. Unfortunately, existing transactional memory systems suffer from certain limitations.

For example, the UTM protocol proposed by Ananian et al. buffers all the old values in a data structure stored in memory (see C. S. Ananian, K. Asanovi'c, B. Kuszmaul, C. Leiserson, and S. Lie, *Unbounded Transactional Memory*, Proceedings of the 11th International Symposium on High-Performance Computer Architecture (HPCA'05), 2005). Similarly, the LogTM protocol proposed by Moore et al., buffers new values in a private cache, and when this cache overflows, buffers old values of the overflowed cache lines in a data structure stored in memory (see K. Moore, J. Bobba, M. Moravan, M. Hill & D. Wood, *LogTM: Log-based Transactional Memory*, 12th Annual International Symposium on High Performance Computer Architecture (HPCA-12), 2006).

The transactional memory protocol described in a pending U.S. patent application entitled "Facilitating Efficient Transactional Memory and Atomic Operations via Cache Line Marking," by the same inventors as the instant application, having Ser. No. 11/655,569, and filing date Jan. 18, 2007 uses cache line marking to improve the performance of systems that support transactional memories (interchangeably called "transactional execution").

In systems that support cache line marking, threads can place load-marks and store-marks on cache lines to prevent other threads from performing interfering accesses on the marked cache line. For example, when a thread reads from a cache line, the thread can place a load-mark on the cache line. When a load-mark has been placed on the cache line, other threads are not allowed to write to the cache line (although other threads may be allowed to read from a cache line load-marked by another thread). In this way, the marking thread can guarantee the consistency of the transaction without unnecessarily limiting other thread's access to the cache line.

Unfortunately, in systems that support cache line marking, the thread that placed a mark on the cache line is obligated to return to the cache line to remove the mark at the end of the transaction. Returning to the marked cache line can add overhead to transactional execution (consuming additional bandwidth and causing delays). For store marks, the overhead is minimal because the cache line is accessed twice (first to ensure that the cache line is writable/place the store-mark and then again to write the value to the cache line after the transaction has completed) and the second access occurs at an advantageous time to remove the store-mark. On the other hand, load-marked cache lines need only be accessed once (because the value can be read from the cache line in the same operation that places the load-mark on the cache line), but the thread must still return to each load-marked cache line to remove the load-marks after the transaction has completed. Furthermore, systems that require removal of load-marks also require keeping track of the lines that were load-marked, and as a result, the number of lines that a thread can load-mark can be limited by the resources devoted to keeping track of the load-marks.

Hence, what is needed is a processor that supports transactional execution without the above-described limitations.

SUMMARY

Embodiments of the present invention provide a system that marks cache lines using shared timestamps. During operation, the system starts a transaction for a thread, wherein starting the transaction involves recording the value of an active timestamp and incrementing a transaction or overflow counter (TO_counter) corresponding to the recorded value. The system then places load-marks on cache lines which are loaded during the transaction. When placing the load-marks, the system writes the recorded value into metadata corresponding to the cache lines. Upon completing the transaction for the thread, the system decrements the TO_counter corresponding to the recorded value and resumes non-transactional execution for the thread without removing the load-marks from cache lines which were load-marked during the transaction.

In some embodiments, the system starts at least one additional transaction for at least one other thread, wherein starting the at least one additional transaction involves recording the value of an active timestamp and incrementing the TO_counter corresponding to the recorded value. The system then places load-marks on cache lines which are loaded during the at least one additional transaction. When placing the load-marks, the system writes the recorded value into metadata corresponding to the cache lines. Upon completing the at least one additional transaction, the system decrements the TO_counter corresponding to the recorded value and resumes non-transactional execution for the at least one other thread without removing the load-marks from cache lines which were load-marked during the at least one additional transaction.

In some embodiments, during the transaction or during an additional transaction, upon evicting a first load-marked cache line to a next level of a memory hierarchy, the system records the value of an active timestamp for the next level of memory hierarchy and increments a TO_counter for the next level of the memory hierarchy corresponding to the recorded value. Then, for the first load-marked cache line and any subsequent load-marked cache lines evicted to the next level of the memory hierarchy during the transaction or the additional transaction, the system places a load-mark on each evicted cache line at the next level of the memory hierarchy, wherein placing the load-mark involves writing the recorded value into metadata associated with the cache line at the next level of the memory hierarchy.

In some embodiments, upon evicting the first load-marked cache line the system asserts an overflow flag corresponding to the recorded value used to load-mark the evicted cache line. Then, when the transaction and the additional transaction complete, if the overflow flag is set, the system decrements the TO_counter at the next level of the memory hierarchy and resumes non-transactional execution for the threads without removing the load-marks from cache lines which were load-marked at the next level of the memory hierarchy.

In some embodiments, the system increments the value of the corresponding timestamp when a TO_counter is decremented to zero.

In some embodiments, the system maintains an active timestamp and an inactive timestamp at each level of the memory hierarchy. The system records the value of the active timestamp as a transaction starts for a level of the memory hierarchy and uses the recorded value to load-mark cache lines during the transaction. Upon the occurrence of a predetermined condition at the corresponding level of the memory hierarchy, the system switches the active timestamp to be inactive and the inactive timestamp to be active.

In some embodiments, the predetermined condition includes: (1) the TO_counter corresponding to the active timestamp is decremented to 0; (2) a predetermined number of cache lines have been load-marked using a timestamp value; or (3) a predetermined time has passed since the first cache line was load-marked using the timestamp value.

In some embodiments, before storing to or placing a store-mark on a cache line, the system determines: (1) if the metadata for the cache line includes a load-mark; (2) if the metadata for the cache line includes a timestamp; and (3) if the TO_counter corresponding to the timestamp is non-zero. The system prevents the store to or the store-marking of a cache line if the metadata for a cache line includes a load-mark, if the metadata for the cache line includes a timestamp, and if the TO_counter corresponding to the timestamp is non-zero.

In some embodiments, a transaction includes the execution of a section of code, an atomic instruction, or an episode of hardware speculative execution.

In some embodiments, the system allows other threads to load from or load-mark a load-marked cache line.

Table 1 illustrates cache line metadata values in accordance with embodiments of the present invention.

Table 2 illustrates variables used to facilitate load-marking in accordance with embodiments of the present invention.

Table 3 illustrates the structure of a set of communication packets that can be sent from a child to a parent in the memory hierarchy in accordance with embodiments of the present invention.

Table 4 illustrates the structure of a communication packet that can be sent from a parent to a child in the memory hierarchy in accordance with embodiments of the present invention.

Table 5 illustrates a set of load-mark variables maintained by a thread in accordance with embodiments of the present invention.

Table 6 illustrates a set of load-mark variables maintained by an L1 cache in accordance with embodiments of the present invention.

Table 7 illustrates a set of load-mark variables maintained by a thread following an example transaction in accordance with embodiments of the present invention.

Table 8 illustrates a set of load-mark variables maintained by an L1 cache following an exemplary transaction in accordance with embodiments of the present invention.

Table 9 illustrates a set of load-mark variables maintained by a thread in accordance with embodiments of the present invention.

Table 10 illustrates a set of load-mark variables maintained by an L1 cache in accordance with embodiments of the present invention.

Table 11 illustrates a set of load-mark variables maintained by an L2 cache in accordance with embodiments of the present invention.

Table 12 illustrates a set of load-mark variables maintained by a thread in accordance with embodiments of the present invention.

Table 13 illustrates a set of load-mark variables maintained by an L1 cache in accordance with embodiments of the present invention.

Table 14 illustrates a set of load-mark variables maintained by an L2 cache in accordance with embodiments of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Computer System

Figure 1:
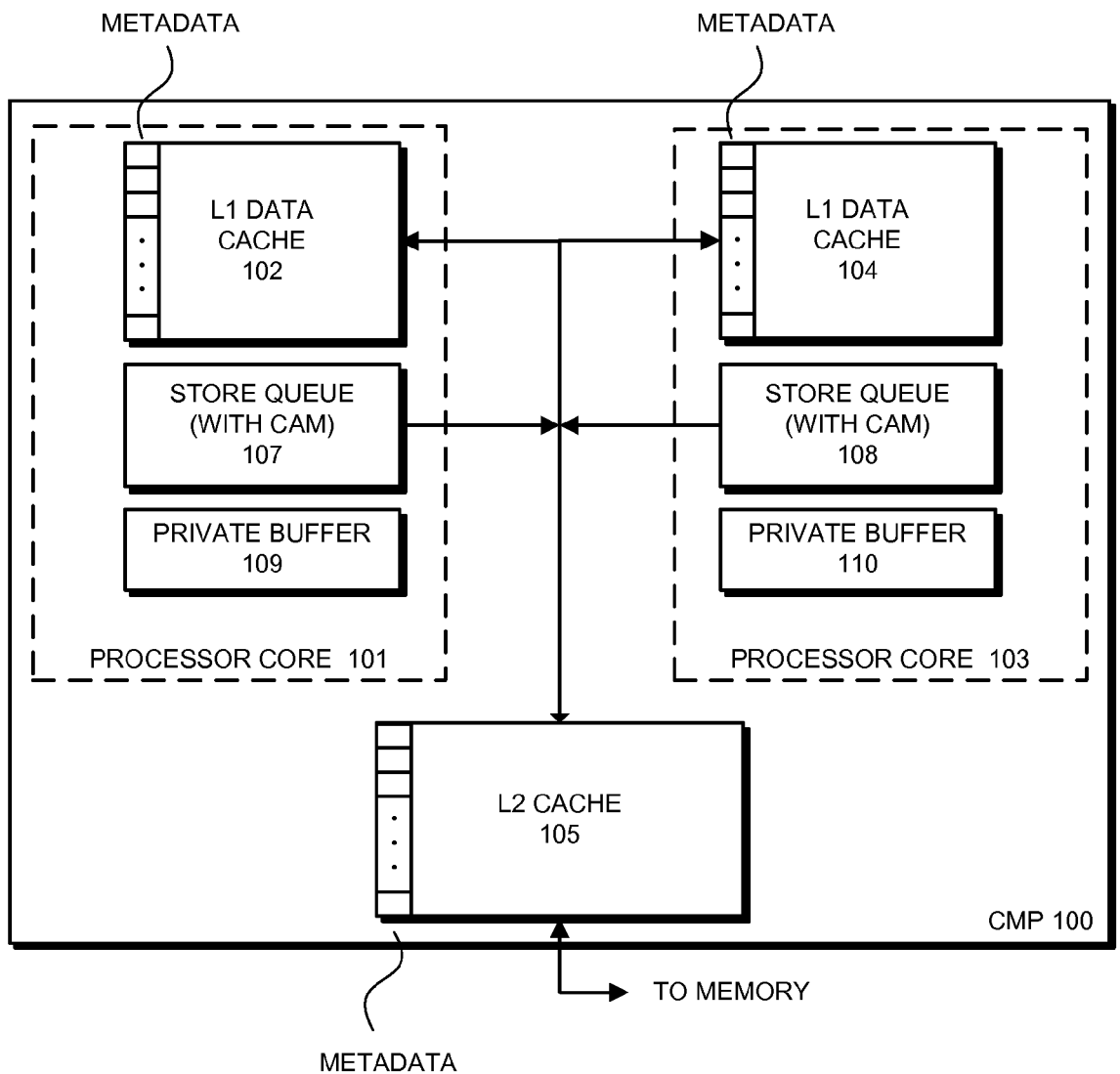
FIG. 1 illustrates an exemplary Chip Multi-Processor (CMP) system in accordance with embodiments of the present invention.

FIG. 1 illustrates an exemplary Chip Multi-Processor (CMP) system 100 in accordance with embodiments of the present invention. CMP system 100 is incorporated onto a single semiconductor die, and includes two processor cores, 101 and 103. Processor cores 101 and 103 include store queues 107 and 108, respectively, which buffer pending store operations.

In addition, processor cores 101 and 103 are coupled to a memory hierarchy, including L1 data caches 102 and 104, shared L2 cache 105, and a shared memory (not shown). For the purposes of illustration, the memory hierarchy is described as a series of "levels." For example, L1 cache 102 is one level of the memory hierarchy. With respect to a given level of the memory hierarchy, a "child" is the next lower level of the memory hierarchy, while "parent" is the next higher level of memory hierarchy. Note that if the current level contains L1 cache 102, we refer to a thread which is associated with L1 cache 102 as a child.

Note that in the following sections of this disclosure, we describe embodiments of the present invention that operate on "cache lines." However, the principles apply to other types of memory in the same way. For example, embodiments of the present invention operate on locations in main memory.

During a store operation, processor core 101 first performs a lookup for a corresponding cache line in L1 data cache 102. If the lookup generates a miss in L1 data cache 102, processor core 101 creates an entry for the store in store queue 107 and sends a corresponding fetch for the store to L2 cache 105. If the lookup generates a hit in the L1 data cache 102, processor core 101 creates an entry for the store in store queue 107.

During a subsequent load operation, processor core 101 uses a CAM structure to perform a lookup in store queue 107 to locate completed but not-yet-retired stores to the same address that are logically earlier in program order. For each byte being read by the load operation, if such a corresponding store exists, the load operation obtains its value from store queue 107 rather than from the memory subsystem.

Processor cores 101 and 103 additionally include private buffers 109 and 110, which maintain copies of addresses of store-marked cache lines to facilitate efficient lookups of these addresses. When a thread needs to load from, store to, load-mark, or store-mark a cache line, the thread checks its private buffer to determine if the thread has already store-marked the cache line.

Cache Line Metadata

Table 1 illustrates cache line metadata values in accordance with embodiments of the present invention. Each level of the memory hierarchy includes a local set of the metadata values. Note that throughout this description, "{0, 1}" corresponds to a Boolean-typed variable; "PA_SIZE" is proportional to the number of cache lines in an exemplary level of the memory hierarchy (such as an L1 cache or main memory); and "pa" is an exemplary address for a cache line.

TABLE 1

Cache Line Metadata

| Variable | Function |
| --- | --- |
| {0, 1} meta_loadmark[PA_SIZE] | If meta_loadmark = 1, a load-mark has been placed on the cache line |
| {0, 1} meta_storemark[PA_SIZE] | If meta_storemark = 1, a store-mark has been placed on the cache line |
| integer meta_timestamp[PA_SIZE] | A timestamp written to the metadata for a cache line when the load-mark is set for the cache line (i.e., meta_timestamp[pa] is valid only if meta_loadmark[pa] = 1) |

As shown in Table 1, each level of the memory hierarchy includes an array of load-marks (i.e., the meta_loadmark array) and an array of store-marks (i.e., the meta_storemark array) which function as metadata for the cache lines in that level of the memory hierarchy. Using the corresponding position in one of the arrays, a thread can place load-marks and store-marks on cache lines. For example, the system writes a 1 into the corresponding position in the meta_loadmark array when placing a load-mark on a cache line.

When a cache line is load-marked, no stores to the cache line are permitted and no store-marks may be placed on the cache line. On the other hand, when a cache line is store-marked, no loads from (or stores to) the cache line from threads other than the one that placed the store-mark are permitted and no load-marks or store-marks may be placed on the cache line by threads other than the one that placed the store-mark. This provides the store-marking thread with exclusive access to the cache line. We refer to the process of placing such load and store marks on a cache line as either "load-marking" or "store-marking" the cache line. Both load-marking and store-marking are described in more detail in the following sections of this disclosure.

Note that a load-mark prevents threads from storing values to or store-marking the cache line but not from loading from the cache line or load-marking the cache line, so other threads can load the cache line (i.e., multiple threads can read the load-marked cache line) or place load-marks in the metadata for a load-marked cache line. For example, a non-load-marking thread can read from the load-marked cache line.

In addition, when a thread has placed a load-mark on a cache line, the thread can perform any number of loads from the cache line. In other words, as long as a load-mark is set on the cache line, the marking thread may freely load from the cache line. The store-mark functions in the same way for stores to the cache line.

As shown in Table 1, each level of the memory hierarchy includes a meta_timestamp array which also functions as metadata for the cache lines. During operation, each level of the memory hierarchy maintains at least one local timestamp value. As part of the load-marking process, a timestamp value is written into the position corresponding to the cache line in the meta_timestamp array.

Load-Mark Variables

Table 2 illustrates variables used to facilitate load-marking in accordance with embodiments of the present invention. Each level of the memory hierarchy includes a copy of the variables.

TABLE 2

Load-Marking Variables

| Variable | Function | Initial Value |
|---|---|---|
| integer timestamp[2] | Timestamp values | timestamp[0] = 0<br>timestamp[1] = 1 |
| {0, 1} timestamp_select | Indicates the active timestamp. | timestamp_select = 0 |
| int TO_counter[2] | TO_counter[x] = number of children using timestamp[x]. | TO_counter[0] = 0<br>TO_counter[1] = 0 |
| {0, 1} overflow[2] | Overflow[x] = 1 if timestamp[x] used for cache line that overflowed to the next higher level of the memory hierarchy. | overflow[0] = 0<br>overflow[1] = 0 |
| {0, 1} parent_timestamp_select | Child's view of parent's timestamp_select value. | parent_timestamp_select = 0 |
| {0, 1} parent_timestamp_map[2] | Parent_timestamp_map[x] selects the parent's timestamp to which timestamp[x] maps. | parent_timestamp_map[0] = 0<br>parent_timestamp_map[1] = 0 |

As shown in Table 2, embodiments of the present invention maintain a set of timestamps in a timestamp array at each level of the memory hierarchy. In these embodiments, one timestamp is active and the other is inactive. The value of the active timestamp is recorded as a transaction begins (transactions are described in more detail in the following sections) and the recorded value is used to load-mark cache lines at that level of the memory hierarchy during the corresponding transaction.

A given timestamp starts at an initial value (e.g., "0" or "1"). During operation, the system can then increment the timestamp when predetermined events occur. For example, when the TO_counter variable corresponding to the timestamp has been decremented to "0," the timestamp is incremented. Alternatively, the system may increment the timestamp after a certain amount of time has passed or after a certain number of transactions have relied on the timestamp.

In embodiments of the present invention, the index of the timestamp's position in the timestamp array is factored into the set of potential valid values of the timestamp. For example, as shown in Table 2, the initial value of the timestamp with the index of 0 is 0 while the value of the timestamp with the index of 1 is 1. During operation, each of these timestamps can be incremented by 2. The system can then determine the index of the timestamp's position in the timestamp array by performing a modulus operation on the value of the timestamp. Hence, assuming that a cache line includes a timestamp of 7, for which 7% 2=1, the system can determine that the index of the timestamp's position in the timestamp array was 1, thereby indicating that timestamp[1] is where the timestamp value originated.

Embodiments of the present invention maintain a timestamp_select variable at each level of the memory hierarchy. The system uses the timestamp_select variable to track which timestamp is active for that level of the memory hierarchy. When switching to a new timestamp, the system updates the value of the timestamp_select.

Embodiments of the present invention maintain a transaction or overflow counter (TO_counter) corresponding to each timestamp for each level of the memory hierarchy. A TO_counter keeps track of the number of children that are executing a transaction that uses a corresponding timestamp to load-mark cache lines. For example, at the L1 cache level, a TO_counter keeps track of the number of threads that have started a transaction, while at the L2 cache level, a TO_counter keeps track of the number of L1 caches that have evicted a load-marked cache line (during at least one load-marking thread's transaction). The TO_counter corresponding to each timestamp is incremented as each child sends a StartTrans packet indicating the timestamp (see Table 3) and decremented as each child sends a StopTrans packet indicating the timestamp.

Embodiments of the present invention also maintain an overflow flag corresponding to each timestamp at each level of the memory hierarchy. The overflow flag is used to track whether the given level of the memory hierarchy has evicted a cache line load-marked with the corresponding timestamp (i.e., "overflowed") during the load-marking thread's transaction.

In addition, embodiments of the present invention maintain a parent_timestamp_select and a parent_timestamp_map at each level of the memory hierarchy. The parent_timestamp_select records a child's view of the parent's active timestamp index (i.e., the parent's timestamp_select value). The child uses the timestamp index recorded in the parent_timestamp_select when starting a transaction with the parent.

A child uses the parent_timestamp_map[x] to record the value of the parent_timestamp_select used to start a transaction with the parent while the corresponding timestamp ("x") was being used to load-mark cache lines in the child. The child then uses the parent_timestamp_map to communicate with the parent during the transaction to ensure that the child uses a consistent timestamp index in communications with the parent during the transaction.

Communication Between Parents and Children

Table 3 illustrates the structure of a set of communication packets that can be sent from a child to a parent in accordance with embodiments of the present invention.

TABLE 3

Communications from Child to Parent

| Packet | Function |
|---|---|
| StartTrans({0, 1} parent_timestamp_select) | Indicates that a child is starting a transaction that uses the specified parent timestamp. |
| StopTrans({0, 1} parent_timestamp_map[x]) | Indicates child has stopped a transaction that used the specified parent timestamp. |
| EvictMarkedLine({0, 1} parent_timestamp_map[x], integer pa) | Indicates child evicted a line with the specified pa that used a local timestamp which maps to the specified parent timestamp. |

A child uses a "StartTrans" packet to communicate to its parent that the child is entering a transaction. Note that "entering a transaction" can have different connotations depending on the nature of the child. For example, when a thread sends a StartTrans packet to an L1 cache, the packet signals to the L1 cache that the thread is executing a transaction and may place load-marks on cache lines within the L1 cache using the indicated timestamp. On the other hand, when a cache sends the StartTrans packet to a higher-level cache or to memory, the packet indicates that the child is preparing to evict a first load-marked cache line using a given timestamp at the given cache (and may evict other load-marked cache lines using a given timestamp at the given cache) to the parent while one or more of the child's own children are executing transactions.

A child uses a "StopTrans" packet to communicate to its parent that the child has stopped a transaction. Note that "stopping a transaction" can have different connotations depending on the nature of the child. For example, when a thread sends a StopTrans packet to an L1 cache, the packet signals to the L1 cache that the thread has completed (or aborted) a transaction and will no longer be placing load-marks on cache lines within the L1 cache using the indicated timestamp during the transaction. On the other hand, at higher levels of the memory hierarchy, when a cache sends the StopTrans packet to a higher-level cache or to memory, the packet indicates that no more of the child's own children are executing transactions using the given timestamp at the child and so the child's transaction is ending.

A child can send an "EvictMarkedLine" packet to indicate that a cache line that is being evicted to the parent should be load-marked at the parent's level. The child sends the EvictMarkedLine packet when the child evicts a load-marked cache line during a transaction. Upon receiving the EvictMarkedLine packet, the parent places a load-mark on the cache line and writes the indicated timestamp into the metadata for the cache line (assuming that any timestamp already present in the metadata is not newer than the indicated timestamp).

Table 4 illustrates the structure of communication packets that can be sent from a parent to a child in the memory hierarchy in accordance with embodiments of the present invention.

TABLE 4

Communications from Parent to Child

| Packet | Function |
|---|---|
| NewParentTimestampSelect(integer child) | Sent to specified child to indicate that the parent has changed its timestamp select value. |

A parent can send a "NewParentTimestampSelect" packet to a child to indicate that the parent has changed the value of the timestamp_select. Upon receiving the NewParentTimestampSelect packet, the child updates its parent_timestamp_select value.

Pseudocode

The following pseudocode illustrates how the system handles load-marks in the memory hierarchy in embodiments of the present invention. Note that in the pseudocode the "//" character indicates a comment.

The following pseudocode illustrates how the system determines if a given cache line (at address "pa") is load-marked. The system first checks to see if there is a load-mark on the cache line. If there is a load-mark, the system determines if the timestamp is current in the metadata for the cache line and then returns "1" if the timestamp is current.

```
{0, 1} CheckLoadMark(integer pa) {
    // determines if a given cache line "pa" has a load mark in
    // a given cache
    integer select;
    if (meta_loadmark[pa] == 1) {
        // set select to index of timestamp used for timestamp
        // for given pa
        select = meta_timestamp[pa] % 2;
        if (timestamp[select] == meta_timestamp[pa]) {
            return(1);
        }
    }
    return(0);
}
```

The following pseudocode illustrates how the system evicts a cache line from a given level of the memory hierarchy. First, if a cache line is load-marked, the system clears the load-mark on the evicted line. The system then determines the timestamp index for the evicted load-marked cache line and maps the timestamp to the parent's timestamp index. Next, the system sends a StartTrans packet (if the overflow flag for the cache line is not already set). Finally, the system sends an EvictMarkedLine packet to the parent using the mapped timestamp index.

```
Evict(integer pa) {
    integer select;
    if (meta_loadmark[pa] == 1) {
    // the following is really done implicitly by evicting the
    //line
        meta_loadmark[pa] = 0;
        // set select to index of timestamp used for timestamp
        // for given pa
        select = meta_timestamp[pa] % 2;
        if (timestamp[select] == meta_timestamp[pa]) {
            if (overflow[select] == 0) {
                overflow[select] = 1;
                parent_timestamp_map[select] =
                parent_timestamp_select;
                SendStartTrans(parent_timestamp_select);
            }
            SendEvictMarkedLine(parent_timestamp_map[select],
            pa);
        }
    }
}
```

The following pseudocode illustrates how a child receives a NewParentTimerSelect packet from a parent. The child uses this method to update its parent_timer_select after the parent changes the parent's timer_select value. This adjustment configures the child to use the current active timestamp index for the parent when sending subsequent StartTrans packets to the parent.

```
ReceiveNewParentTimestampSelect(integer child) {
    parent_timestamp_select = 1 – parent_timestamp_select;
}
```

The following pseudocode illustrates how a parent receives a StartTrans packet from a child. The parent increments the local TO_counter corresponding to the indicated timestamp.

```
ReceiveStartTrans({0, 1} received_timestamp_select) {
    // received_timestamp_select is value of
    // parent_timestamp_select field of StartTrans packet
    ++TO_count[received_timestamp_select];
}
```

The following pseudocode illustrates how a parent receives a StopTrans packet from a child. Upon receiving the StopTrans packet, the parent first decrements the local TO_counter corresponding to the indicated timestamp. If decrementing the TO_counter causes the TO_counter to reach "0" (i.e., all children have completed their transactions), the parent increments the timestamp. If the overflow variable corresponding to the timestamp is set, the parent also maps the received timestamp index to the parent's parent's (i.e., the next level in the memory hierarchy) timestamp index and sends a StopTrans packet to the parent's parent using the mapped timestamp index.

```
ReceiveStopTrans({0, 1} received_timestamp_select) {
    // received_timestamp_select is value of
    // parent_timestamp_select field of StopTrans packet
    --TO_count[received_timestamp_select];
    if (TO_count[received_timestamp_select] == 0) {
        if (timestamp_select != received_timestamp_select) {
            timestamp[received_timestamp_select] += 2;
            timestamp_select = 1 - timestamp_select;
        }
        if (overflow[received_timestamp_select] == 1) {
            SendStopTrans(parent_timestamp_map[received_time
            stamp_select]);
        }
    }
}
```

The following pseudocode illustrates how a parent receives an evicted load-marked cache line from a child. The parent first determines whether a load-mark is asserted for the cache line. If not, the parent asserts the load-mark for the cache line and writes the received timestamp select value into the metadata for the cache line. Otherwise, if the cache line already has a load-mark, the parent updates an old timestamp value with received timestamp select value.

```
ReceiveEvictMarkedLine({0, 1} received_timestamp_select, int
received_pa) {
    // received_timestamp_select and received_pa are values of
    // parent_timestamp_select and pa fields, respectively, of
    // the EvictMarkedLine packet
    if (meta_loadmark[received_pa] == 0) {
        meta_loadmark[received_pa] = 1;
        meta_timestamp[received_pa] =
        meta_timestamp[received_timestamp_select];
    }
    else if (received_timestamp_select == timestamp_select) {
        // update timestamp to potentially newer value
        meta_timestamp[received_pa] =
        meta_timestamp[received_timestamp_select];
    }}
```

Load-Marking

The Load-Mark Request Operation

Figure 2A:
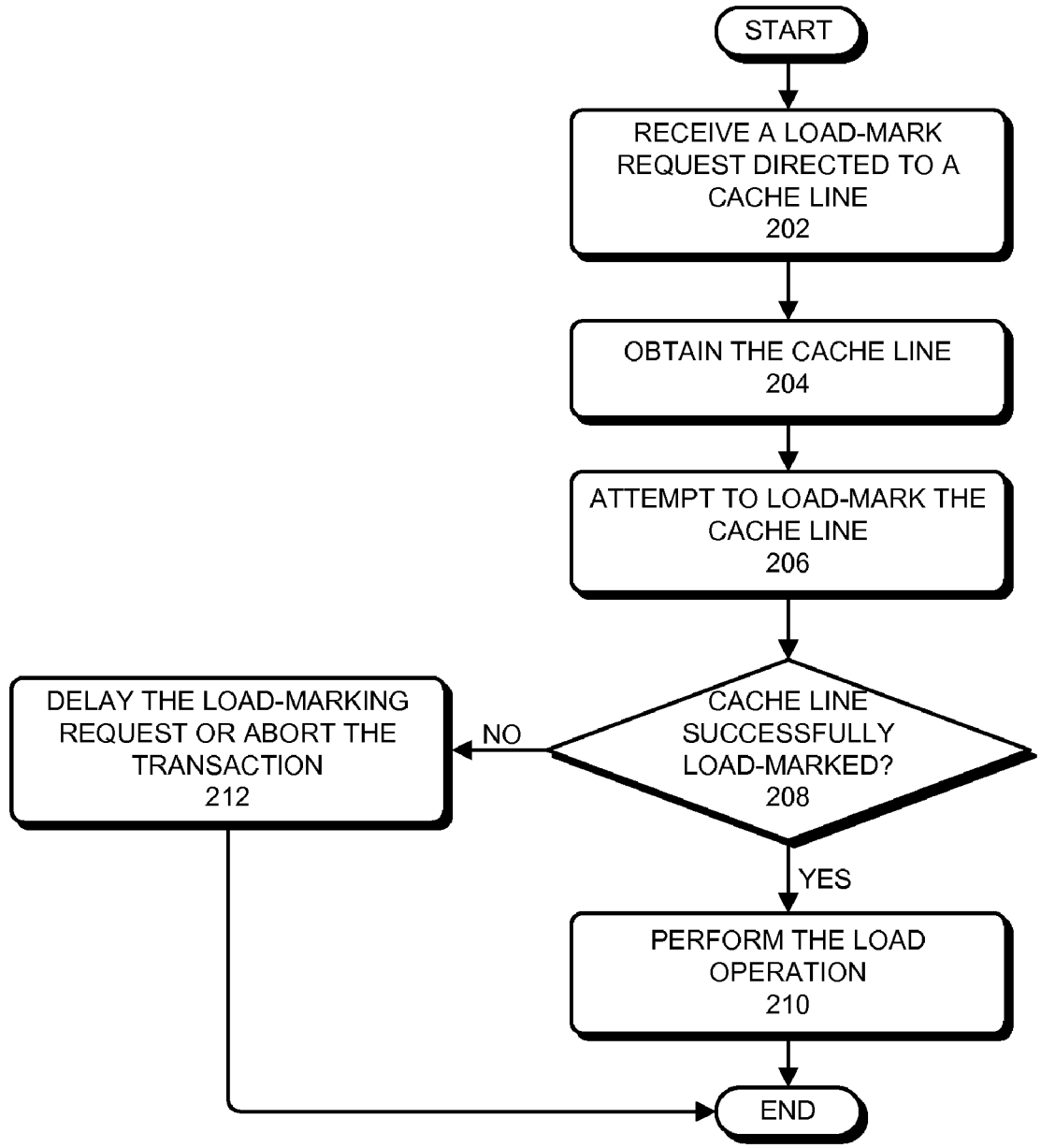
FIG. 2A presents a flowchart illustrating the process of handling a load-mark request in accordance with embodiments of the present invention.

FIG. 2A presents a flowchart illustrating the process of handling a load-mark request in accordance with embodiments of the present invention. Note that handling the load-mark request involves two operations; the load-marking operation and the load operation. When a load-mark request is handled, the system first attempts the load-marking operation. Upon successfully concluding the load-marking operation, the system automatically returns the cache line, thereby completing the load operation.

More specifically, this process starts when the system receives a load-mark request from a thread, wherein the load-mark request is directed to a cache line (step 202). The system first obtains the cache line (step 204) and attempts to load-mark the copy of the cache line in the local cache (step 206).

If load-marking is successful (step 208), the system performs the load operation (step 210). Otherwise, if the load-marking is unsuccessful, the system retries the load-mark request after a delay. In embodiments of the present invention, the load-mark request is retried a predetermined number of times, and if the load-mark request remains unsuccessful, the transaction is aborted (step 212).

Figure 2B:
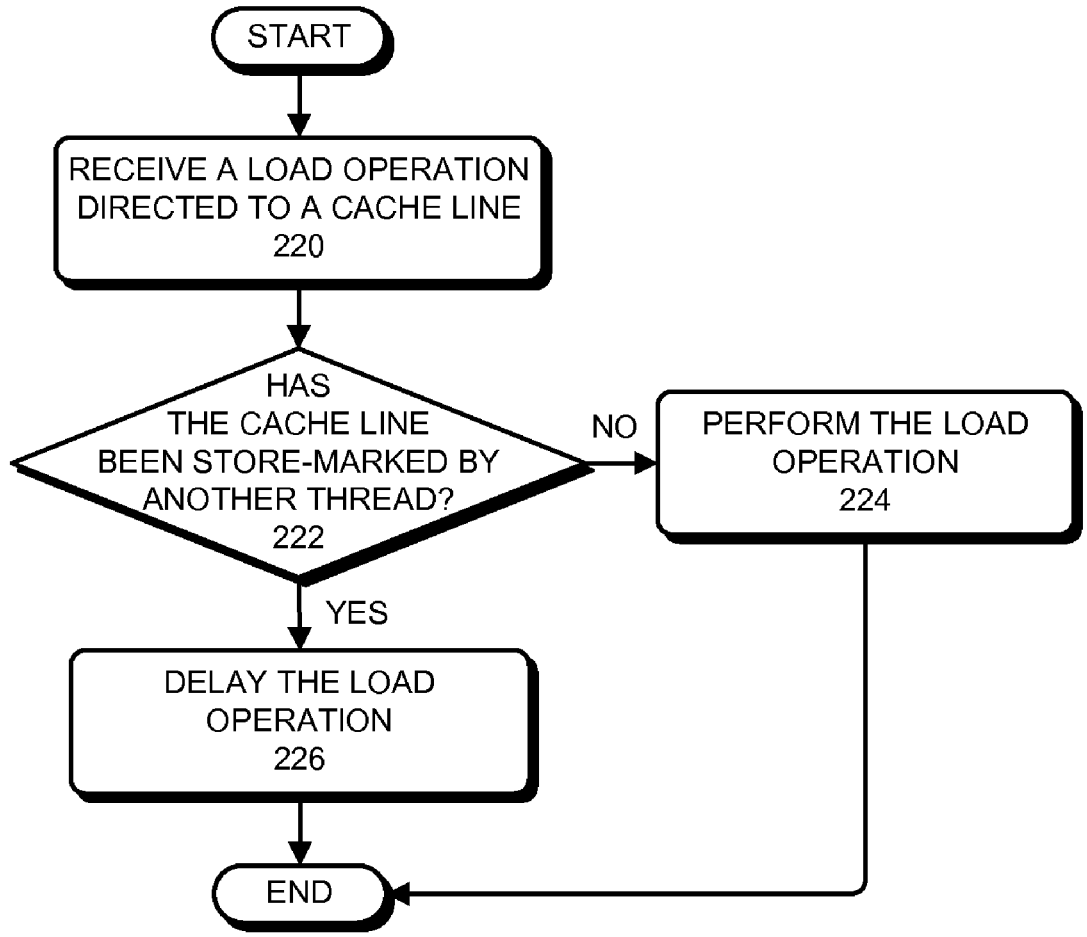
FIG. 2B presents a flowchart illustrating the process of performing a load operation without load-marking the cache line in accordance with embodiments of the present invention.

FIG. 2B presents a flowchart illustrating the process of performing a load operation without load-marking the cache line in accordance with embodiments of the present invention. The process starts when the system receives a load operation from a thread, wherein the load operation is directed to a cache line (step 220).

The system then determines if the cache line has been store-marked by another thread (step 222). If so, the thread cannot load the cache line and the load operation is retried after a delay (step 226). Note that the presence of another thread's load-marks on the cache line does not prevent the non-load-marking thread from loading from the cache line. Hence, if the cache line has not been store-marked by another thread, the system performs the load operation (step 228).

Attempting to Load-Mark the Cache Line

Figure 3:
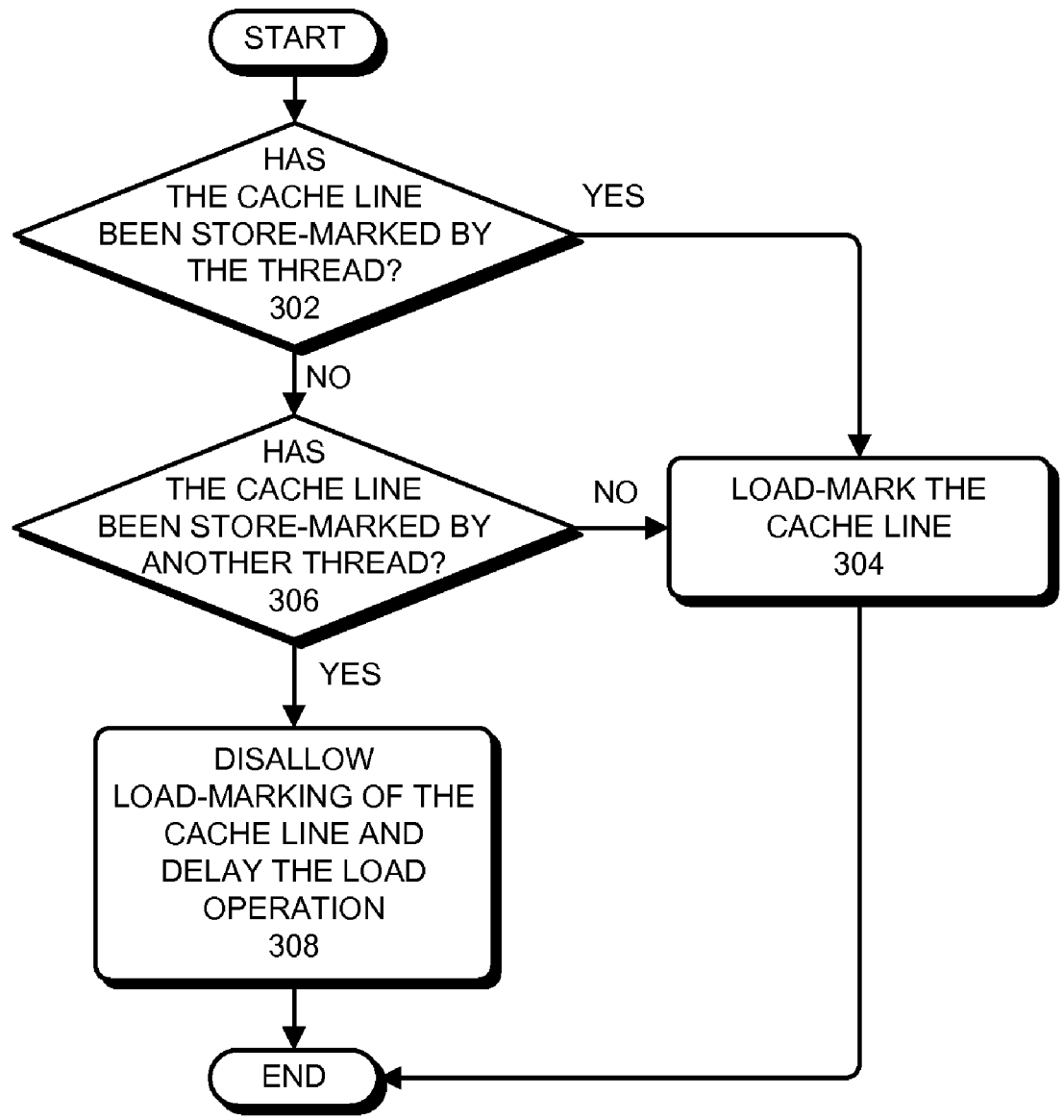
FIG. 3 presents a flowchart illustrating the process of attempting to load-mark the cache line in accordance with embodiments of the present invention.

FIG. 3 presents a flowchart illustrating the process of attempting to load-mark the cache line in accordance with embodiments of the present invention. During this process, the system first determines whether the cache line has been store-marked by the thread (step 302). Specifically, the system checks to see if the address of the cache line exists in the private buffer 109. If the cache line has been store-marked by the thread, no other thread is permitted to load-mark the cache line (because of the exclusive property of store-marks). However, the thread may itself place a load-mark on a cache line that the thread has already store-marked. Hence, in this case, the system load-marks the cache line (step 304). When load-marking the cache line, the system also writes a timestamp value into the metadata for the cache line.

On the other hand, if the system determines that the cache line has not been store-marked by the thread, the system next determines if the cache line has been store-marked by another thread (step 306). If so, the thread cannot load-mark the cache line and the load operation is delayed (step 308). Otherwise, the system knows that the cache line has not been store-marked by any thread and the system load-marks the cache line for the thread (step 304). When load-marking the cache line, the system also writes a timestamp value into the metadata for the cache line.

Figure 4:
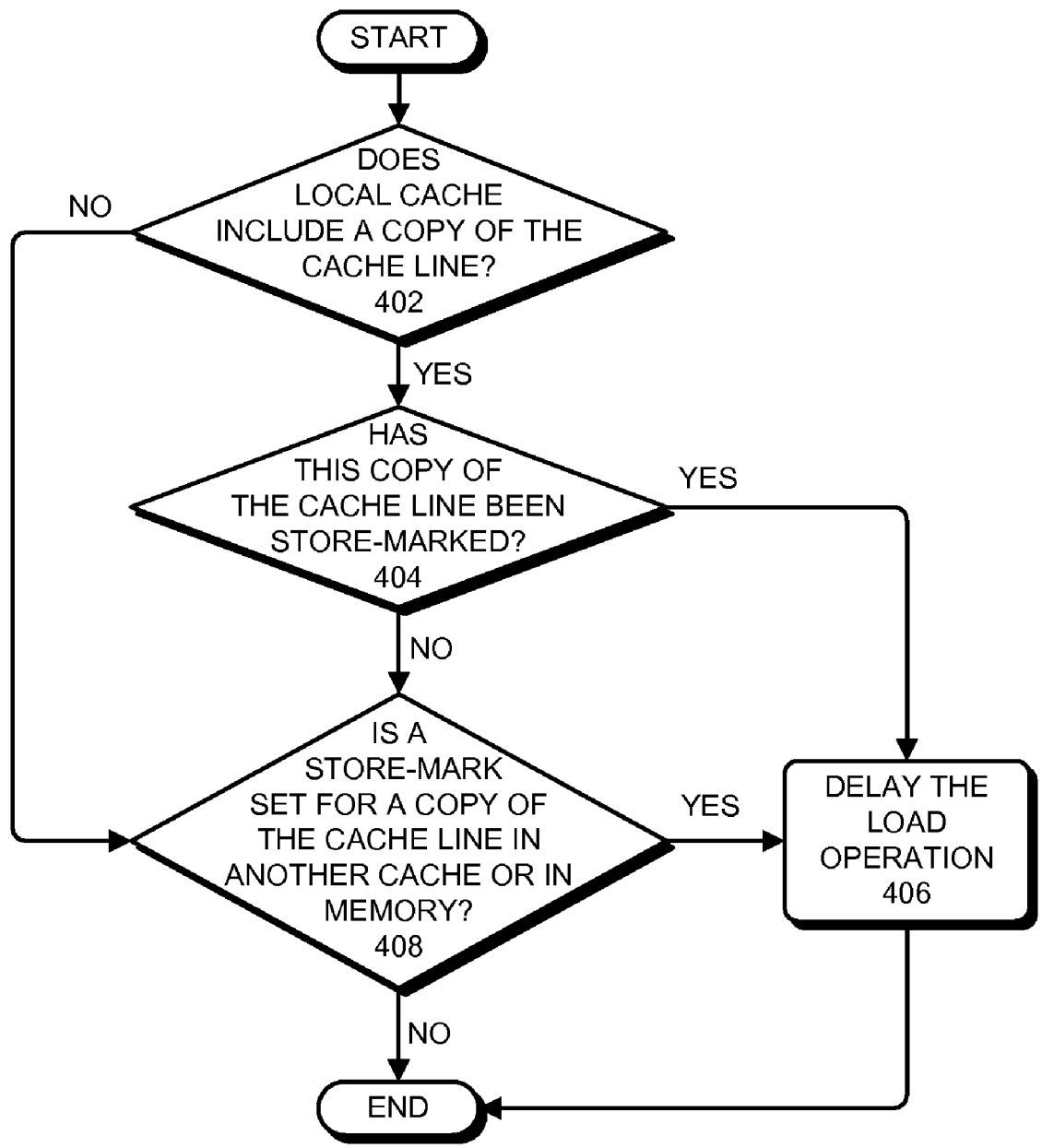
FIG. 4 presents a flowchart illustrating the process of determining whether the cache line has been store-marked by another thread in accordance with embodiments of the present invention.

FIG. 4 presents a flowchart illustrating the process of determining whether the cache line has been store-marked by another thread in accordance with embodiments of the present invention. During this process, system first checks in the thread's local cache for a copy of the cache line (step 402). If the system finds a copy of the cache line in the thread's local cache, the system examines the store-mark in the copy of the cache line to determine whether the cache line has been store-marked by another thread (step 404). If so, the cache line cannot be load-marked and the load operation is delayed (step 406).

On the other hand, if there is no valid copy of the cache line in the local cache, the system determines whether the store-mark has been set in another copy of the cache line which exists in another cache or in memory (step 408). If so, the cache line has been store-marked by another thread, consequently the cache line cannot be load-marked, and the load operation is delayed (step 406).

Store-Marking

The Store-Marking Operation

Figure 5A:
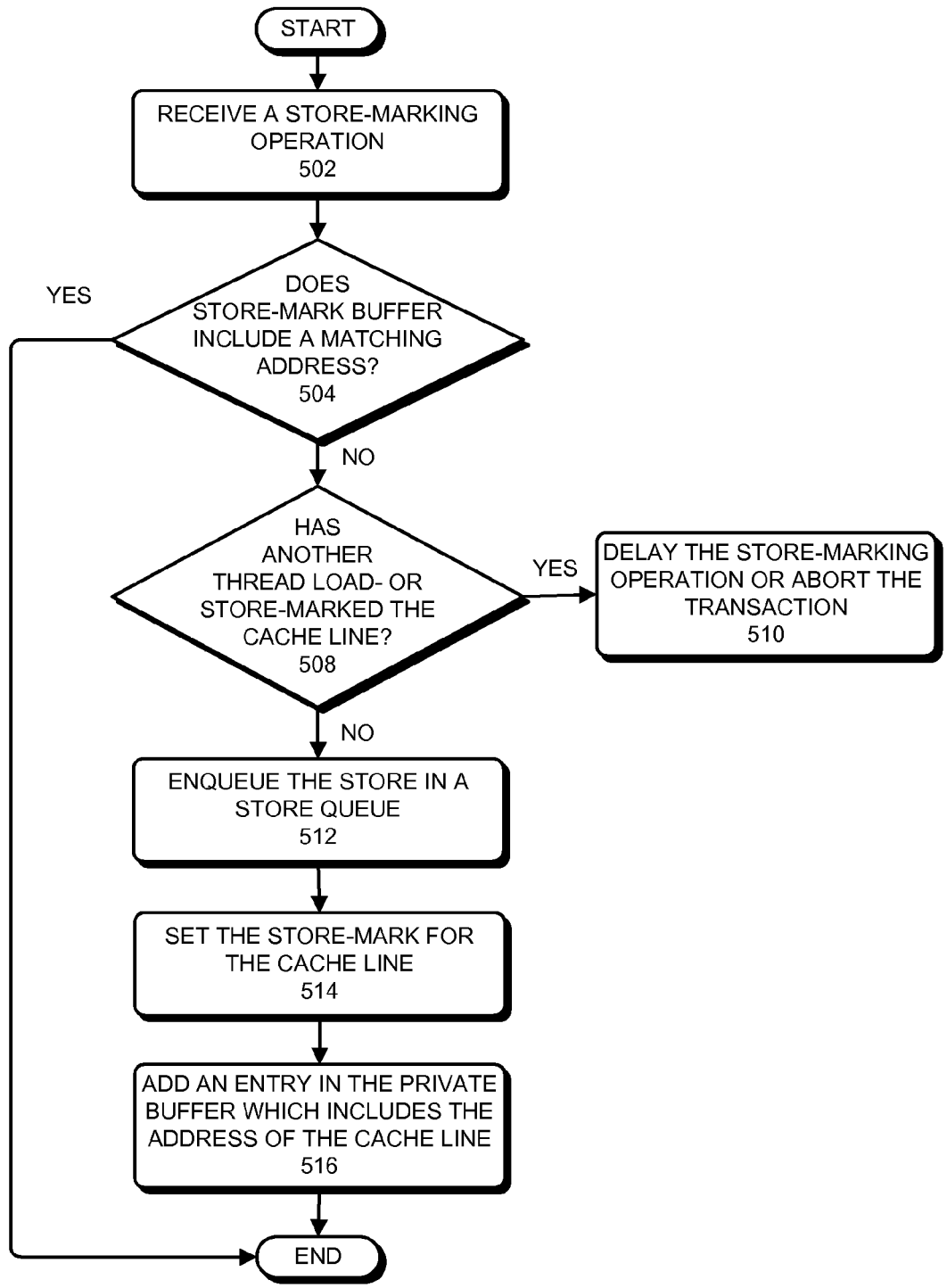
FIG. 5A presents a flowchart illustrating the process of performing a store-marking operation in accordance with embodiments of the present invention.

FIG. 5A presents a flowchart illustrating the process of performing a store-marking operation in accordance with embodiments of the present invention. The system first receives a store-marking operation which is directed to a cache line (step 502).

Next, the system checks the thread's private buffer 109 to determine whether the thread has already store-marked the cache line (step 504). Specifically, the system performs a lookup in the thread's private buffer 109 based on the address of the memory reference to locate a corresponding address for a store-marked cache line. If the private buffer 109 contains a corresponding address, the store-marking operation ends.

If, however, the private buffer 109 does not contain a matching address, the system determines whether the cache line has been load-marked or store-marked (step 508). During this process, system first checks in the thread's local cache for a copy of the cache line. If the system finds a copy of the cache line, the system examines the store-mark to determine whether the cache line has been store-marked by another thread. If the store-mark in the copy of the cache line is not set, the system determines whether the store-mark has been set in another copy of the cache line which exists in another cache or in memory. If a store-mark is set in either location, the store-marking operation is delayed and retried (step 510).

If the cache line has not been store-marked, the system determines whether the cache line has been load-marked. During this process, system first checks in the thread's local cache for a copy of the cache line. If the system finds a copy of the cache line, the system checks determines if there is a load-mark on the cache line. If so, the system determines if the timestamp on the cache line is current. In order to make this determination, the system uses the timestamp from the cache line's metadata to compute the index of the position in the timestamp array that corresponds to the timestamp. For example, the index can be calculated using (timestamp % 2)=index. The system then determines if the timestamp is equal to the value held in timestamp[index]. If so, the timestamp that was used to load-mark the cache line is current. In this case, the system determines if there is any thread that is executing a transaction using the timestamp. In order to make this determination, the system determines if the TO_counter [index] value is greater than 0. If so, there is at least one thread that is executing a transaction using the timestamp value. Because storing a value to the cache line may overwrite a value that the thread is loading during the transaction, the store-marking operation is delayed and retried (step 510).

If a copy of the cache line is not present in the thread's local cache, the system determines whether the load-mark is set in another copy of the cache line which exists in another cache or in memory. If so, the system determines if the timestamp in the metadata for the copy of the cache line in the other cache or in memory is current. When determining whether the timestamp in the metadata for the cache line in another cache or in memory is current, the system uses the same process as with the copy of the cache line in the local cache; however, the system uses the copy of the load-marking variables corresponding to the other cache or memory (i.e., the timestamp array, the TO_counter, and the other variables used during the determining process are those corresponding to the other cache or memory). If a load-mark with a current timestamp is found on a cache line in another cache or in memory while the corresponding TO_counter is nonzero, the store-marking operation is delayed and retried (step 510).

In embodiments of the present invention, the store-marking operation is retried a predetermined number of times, and if the store-marking operation continues to be unsuccessful, the transaction is aborted (step 510).

Note that the system can use a cache-coherence mechanism to determine whether another cache or the memory holds a store-marked or load-marked copy of the cache line. This can involve sending an exclusive access request for the cache line to the other caches. If successful, the exclusive access request returns the cache line including store-mark status. In embodiments of the present invention, if the cache line has been store-marked in another cache, the system receives a NACK signal from the other cache which causes the request to fail, in which case the memory operation can be retried. In this embodiment, however, if the system does not receive a NACK signal, the system can then obtain exclusive (writable) access to that cache line.

Note that in order to perform a memory operation, it may be necessary to use the cache coherence protocol to obtain a copy of the cache line in a suitable state in the local cache. For example, if the memory operation is a load, the system obtains a copy of the cache line in the shared (S), exclusive (E), owned (O), or modified (M) state. Similarly, if the memory operation is a store, it the system obtains a copy of the cache line in the E or M state (and if the cache line is in the E state, the system may change the cache line to the M state upon performing the store). If the cache coherence protocol is used to obtain a copy of the cache line in the E or M state, the request for this copy may differ from the exclusive access request mentioned in the preceding description. This is because the thread performing the store has already placed a store mark on the cache line, and thus the request should not receive a NACK signal.

If a store-mark is not set and the load-mark is not set or is "stale" (i.e., there is no thread currently executing a transaction that uses the load-mark), the system enqueues the store operation in store queue 107 (step 512). The system then sets the store-mark for the cache line (step 514) and adds the address of the cache line to the private buffer 109 (step 516). Note that this entry remains in the private buffer 109 until subsequent changes are made to the state of the cache line, such as removing the store-mark.

In embodiments of the present invention, the system removes stale load-marks from cache lines while performing the store-marking operation. In alternative embodiments, the system leaves the stale load-mark on a given cache line while performing the store-marking operation.

In embodiments of the present invention, when a thread performs one or more stores to a store-marked cache line, the last of the stores can include a flag indicating that the store-mark should be cleared. When such a flag is encountered, the system releases the store-marked cache line by unsetting the store-mark in a copy of the cache line in its local cache, and additionally removing the address of the cache line from its private buffer 109.

In embodiments of the present invention, a thread selectively places store-marks on cache lines. In other words, the thread may reorder some stores and not reorder other stores, in which case the thread store-marks on cache lines associated with stores that are reordered, but does not have to store-mark cache lines associated with stores that are not reordered and that are not part of a transaction.

Figure 5B:
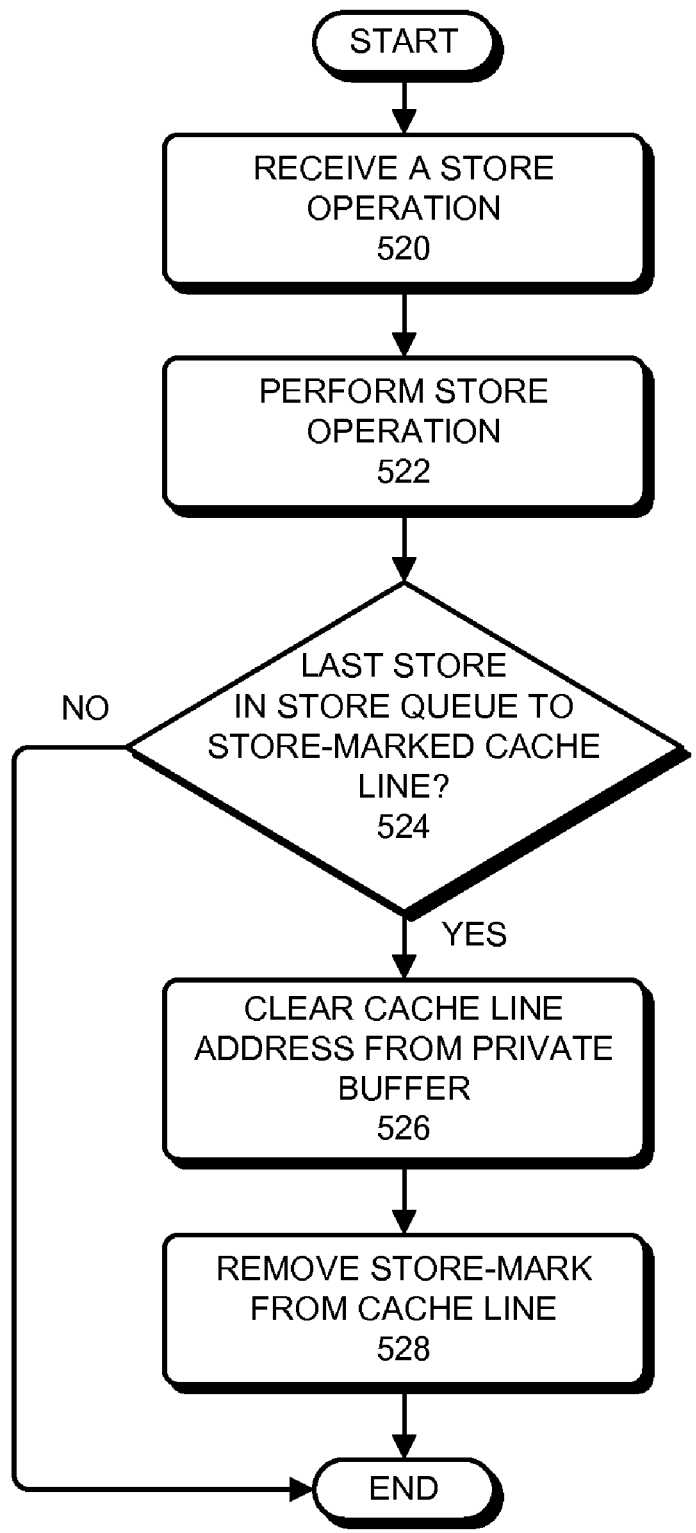
FIG. 5B presents a flowchart illustrating the process of performing a store operation for a cache line that has been store-marked in accordance with embodiments of the present invention.

FIG. 5B presents a flowchart illustrating the process of performing a store operation for a cache line that has been store-marked in accordance with embodiments of the present invention. The system first receives a store operation for a thread which is directed to a cache line from the store queue (step 520) and performs the store operation (step 522).

The system then determines if the store operation was the last store operation in the store queue to a store-marked cache line (step 524). If the store operation was the last store operation, the system clears the address of the store-marked cache line from the private buffer (step 526) and removes the store-mark from the cache line (step 528).

Figure 5C:
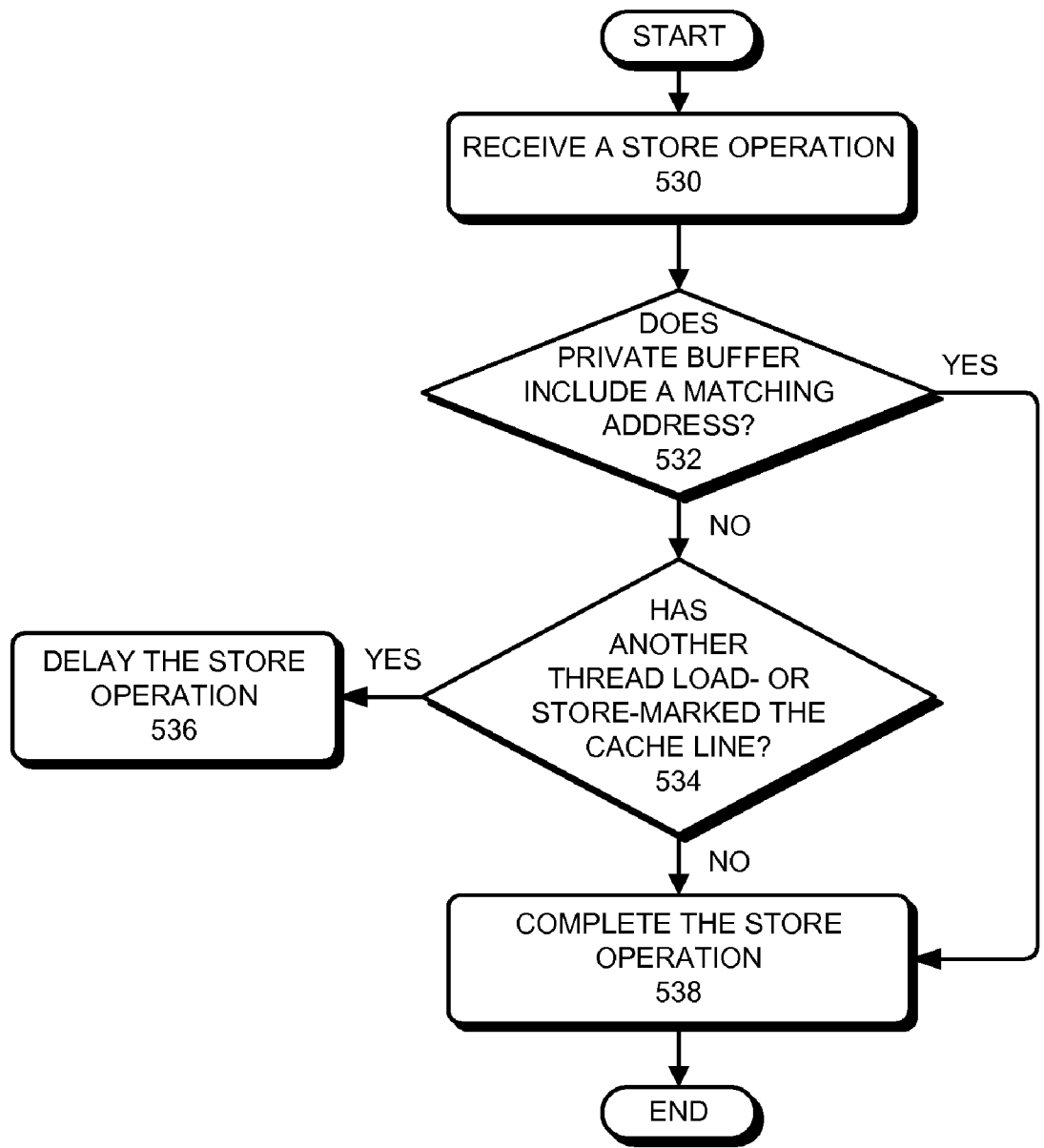
FIG. 5C presents a flowchart illustrating the process of performing a store operation for a cache line that has not been store-marked in accordance with embodiments of the present invention.

FIG. 5C presents a flowchart illustrating the process of performing a store operation for a cache line that has not been store-marked in accordance with embodiments of the present invention. The system first receives a store operation for a thread from the store queue which is directed to a cache line (step 530). For the purposes of illustration, we assume that the store operation was the oldest store operation in the store queue and that the store operation has not been re-ordered with respect to other store operations.

Next, the system checks the thread's private buffer 109 to determine whether the thread has already store-marked the cache line (step 532). Specifically, the system performs a lookup in the thread's private buffer based on the address of the memory reference to locate a corresponding address for a store-marked cache line. If the private buffer contains a corresponding address, the thread proceeds with the store operation (step 538).

If, however, the private buffer does not contain a matching address, the thread concludes that it has not set the store-mark. If the thread has not set the store-mark, the system determines whether the cache line has been store-marked or load-marked by another thread (step 534). During this process, the system first checks in the thread's local cache for a copy of the cache line. If the system finds a copy of the cache line, the system examines the store-mark to determine whether the cache line has been store-marked by another thread. If the store-mark in the copy of the cache line is not set, the system determines whether the store-mark has been set in another copy of the cache line which exists in another cache or in memory. If a store-mark is set in either location, the store operation delayed and retried (step 536).

If the cache line has not been store-marked, the system determines whether the cache line has been load-marked. During this process, system first checks in the thread's local cache for a copy of the cache line. If the system finds a copy of the cache line, the system determines if there is a load-mark on the cache line. If so, the system determines if the timestamp on the cache line is current. In order to make this determination, the system uses the timestamp from the cache line's metadata to compute the index of the position in the timestamp array that corresponds to the timestamp. For example, the index can be calculated as (timestamp % 2)=index. The system then determines if the timestamp is equal to the value held in timestamp[index]. If so, the timestamp that was used to load-mark the cache line is current. In this case, the system determines if there is any thread that is executing a transaction using the timestamp. In order to make this determination, the system determines if the TO_counter[index] value is greater than 0. If so, there is at least one thread that is executing a transaction using the timestamp value. Because storing a value to the cache line may overwrite a value that the thread is loading during the transaction, the store-marking operation is delayed and retried (step 536).

If a copy of the cache line is not present in the thread's local cache, the system determines whether the load-mark is set in another copy of the cache line which exists in another cache or in memory. If so, the system determines if the timestamp in the metadata for the copy of the cache line in the other cache or in memory is current. When determining whether the timestamp in the metadata for the cache line in another cache or in memory is current, the system uses the same process as with the copy of the cache line in the local cache; however, the system uses the copy of the load-marking variables corresponding to the other cache or memory (i.e., the timestamp array, the TO_counter, and the other variables used during the determining process are those corresponding to the other cache or memory). If a load-mark with a current timestamp is found on a cache line in another cache or in memory, the store-marking operation is delayed and retried (step 536).

Propagating Store-Marks

In embodiments of the present invention, the system eventually propagates the store-marks in the metadata for a cache line to the other caches and to memory. The following sections explain the process of propagating the store-marks. (Note that we interchangeably refer to store-marks as "metadata.")

Obtaining a copy of the cache line in the proper coherency protocol state (as detailed in the following sections) is just the first step in writing to a cache line. After the cache line has been obtained in the proper coherency protocol state, the system has to verify that the desired access can be performed and, if necessary, add a store-mark before performing a write to the cache line.

Figure 6A:
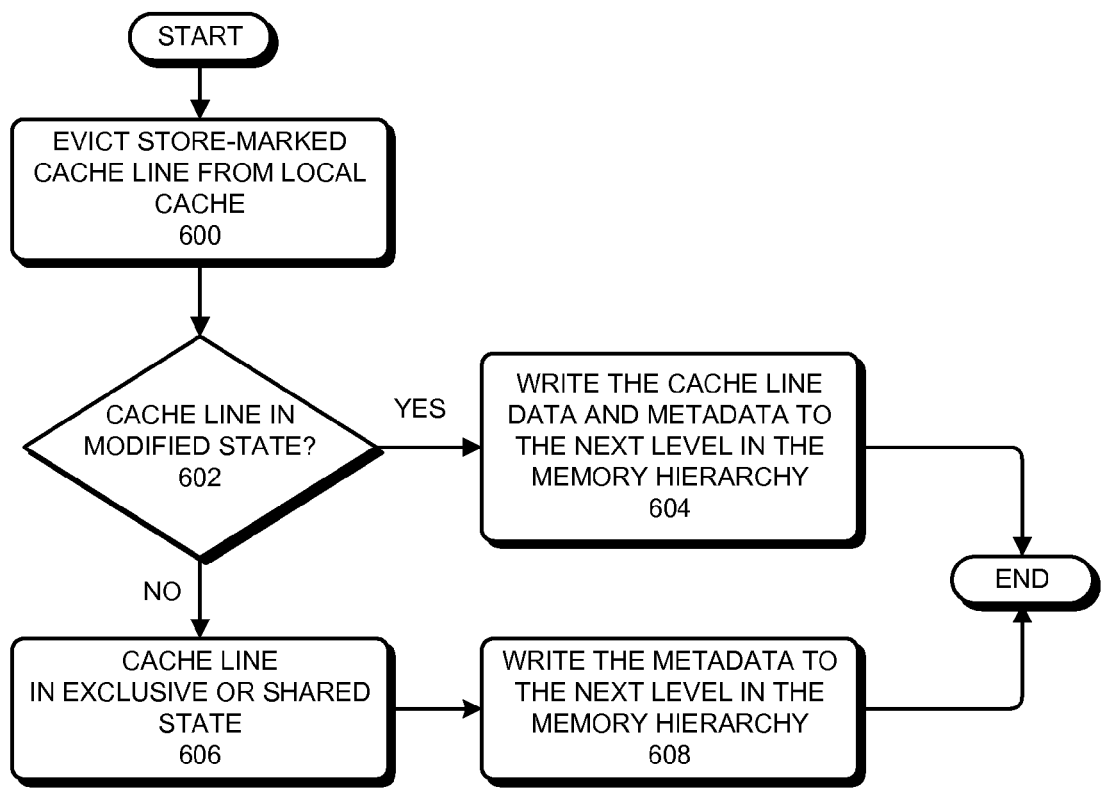
FIG. 6A presents a flowchart illustrating the process of propagating load-mark metadata for an evicted cache line in accordance with embodiments of the present invention.

We first consider the case where a store-marked cache line is evicted from a cache as illustrated in FIG. 6A. The process starts when a store-marked cache line is evicted from a cache (step 600). The system determines if the store-marked cache line is in the modified state (step 602). If so, the system evicts the cache line by writing the cache line data and the metadata to the next level of the memory hierarchy (step 604).

On the other hand, if the store-marked cache line is not in the modified state, but is in the exclusive state or shared state (step 606), the system does not propagate the data in the cache line, but writes the metadata to the next level of the memory hierarchy (step 608).

Figure 6B:
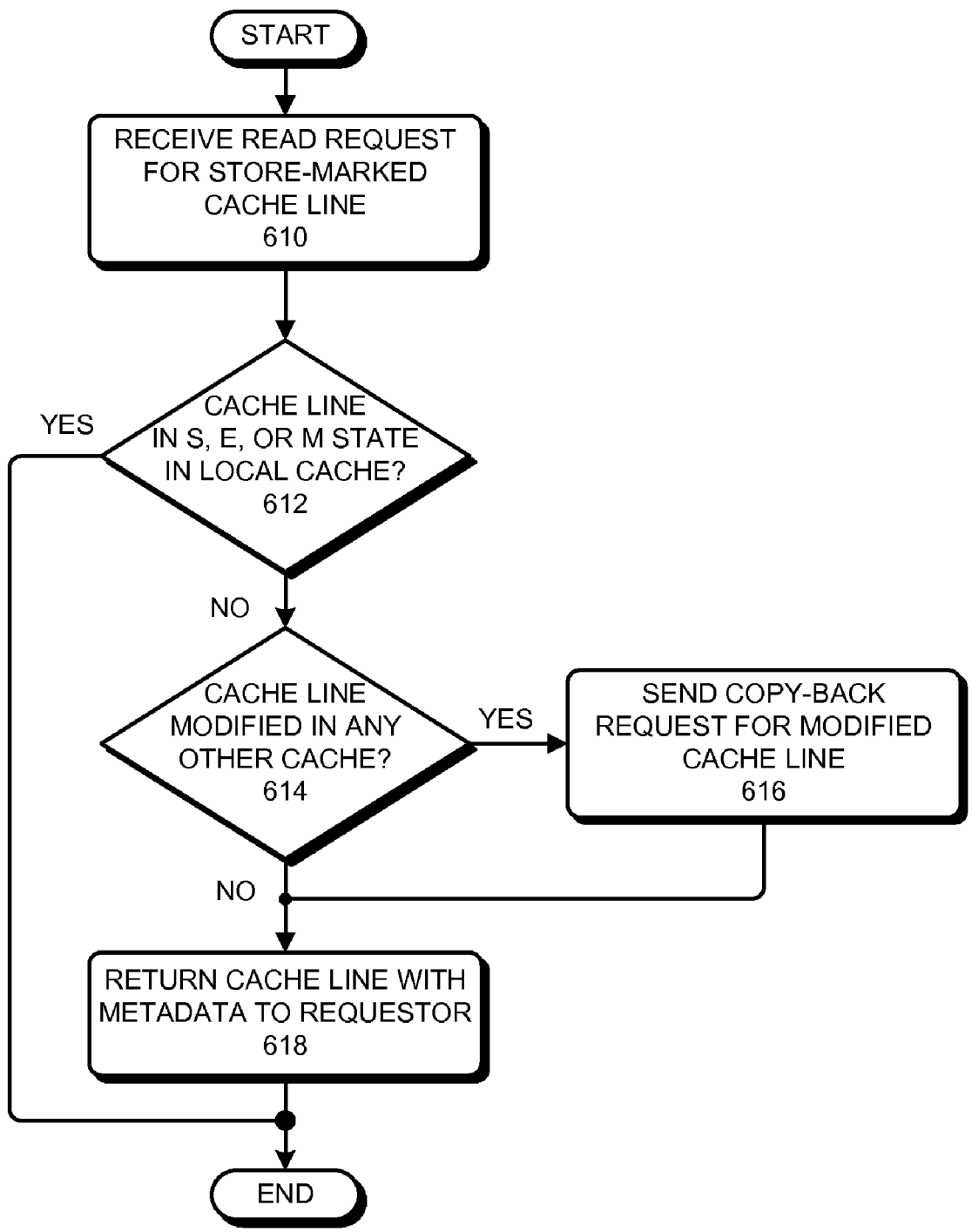
FIG. 6B presents a flowchart illustrating the process of propagating load-mark metadata for a cache line during a read operation in accordance with embodiments of the present invention.

We next consider the case where the store-marked cache line is subject to a read operation as illustrated in FIG. 6B. The process starts when the system receives a read request for a cache line (step 610). The system first determines if the cache line is held the shared, exclusive, or modified state the thread's local cache (step 612). If so, the thread can read the local copy of the cache line and the process is complete.

Otherwise, the system determines if the store-marked cache line is held in any other processor's cache in the modified state (step 614). If so, the system sends a copyback coherence request to that cache (step 616). Upon receiving a copyback coherence request, the processor that holds the modified copy of the cache line responds with a copy of the cache line, which are returned to the requestor (step 618).

Figure 6C:
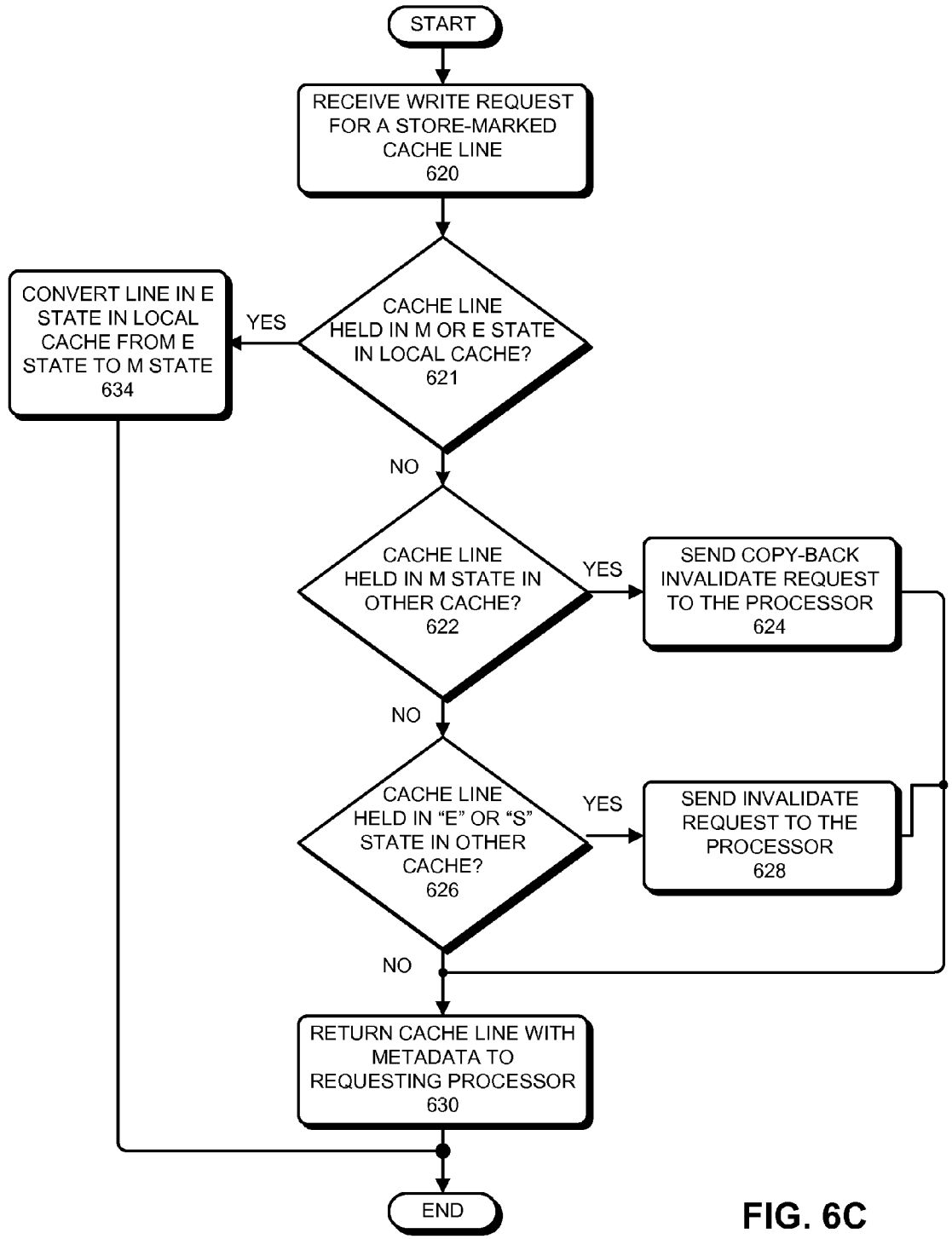
FIG. 6C presents a flowchart illustrating the process of propagating load-mark metadata for a cache line during a write operation in accordance with embodiments of the present invention.

We next consider the case where the store-marked cache line is subject to a write request that is illustrated in FIG. 6C. Note that a thread attempting to write to the store-marked cache line first obtains a copy of the store-marked cache line in the modified state, which invalidates all copies of the line in other caches and obtains the cache line in the modified state for the requesting thread.

The process starts when the system receives a write request for a store-marked cache line (step 620). The system first determines if the store-marked cache line is held in the local cache in the modified or exclusive state (step 621). If the store-marked cache line is held in the modified state, the thread already has write access to the cache line, so the process is complete.

If the store-marked cache line is held in the exclusive state, the system can change the status of the copy of the cache line to the modified state (step 634). In order to change the status of the local copy of the cache line from the exclusive state to the modified state, the system implicitly invalidates the copy of the cache line held in the memory system.

If the store-marked cache line is held in any other processor's cache in the modified state (step 622), the system sends a copyback-invalidate coherence request to that cache (step 624). Upon receiving the copyback-invalidate coherence request at a given cache that holds the copy of the cache line, the cache line data and metadata are propagated back to memory and the local copy of the given cache line in the given cache is invalidated.

On the other hand, if the system receives a write request for a store-marked cache line that is held in any other processor's cache in the exclusive state or the shared state (step 626), the system sends an invalidate coherence request to all other caches in the coherence domain that may contain a valid copy of the cache line (step 628). Upon receiving the invalidate coherence request at a given cache that holds the copy of the cache line, the metadata is propagated back to memory and the local copy of the cache line in the given cache is invalidated.

The system then responds to the requester with a cache line, including the metadata (step 630).

Propagating Load-Marks

Propagating load-marks/timestamps for evicted load-marked cache lines involves different techniques than propagating store-marks, as described in the previous sections (e.g., in the "Cache Line Metadata" section). However, in some embodiments of the present invention, when a load marked cache line is copied back to provide a readable copy to another thread, the load-mark and timestamp do not need to be copied back with the cache line data. Furthermore, in some embodiments of the present invention, when a load-marked cache line receives an invalidation request in order to provide an exclusive, writable copy of the line to another thread, the invalidation request can be NACK'ed and the load-mark and timestamp can be kept (assuming the load-mark is current).

Transactions

Embodiments of the present invention implement transactions by maintaining a transaction state (including a "not-in-transaction" state and a "transaction-pending" state) for each thread and by buffering data from stores which occur during the transaction in the store queue. The system then either commits the transaction by performing the associated stores, or aborts the transaction by removing the associated stores from the store queue and restoring the pre-transactional state of the thread from a checkpoint generated at the start of the transaction.

The preceding sections of this disclosure describe how load-marks and store-marks can be placed on cache lines to allow an arbitrary number of reads and writes to be performed to those cache lines. The reads and writes can be placed in the memory order at any point from the placing of the corresponding load-mark or store-mark on the line to the clearing of that mark, regardless of when they were actually performed by the hardware.

Embodiments of the present invention use load-marks and store-marks to implement transactions by requiring that (1) the processor (or thread) places a load-mark on all lines read in a transaction, (2) the processor (or thread) places a store-mark on all lines written in the transaction, (3) these load-marks and store-marks are all held simultaneously when the transaction commits, (4) all loads that precede the transaction in program order are either committed prior to the transaction commit or have a load-mark on the cache line when the transaction commits, and (5) all stores that precede the transaction in program order are either committed prior to the transaction commit or have a store-mark on the cache line when the transaction commits. These rules guarantee that all reads and writes within the transaction can be placed (in program order) in the memory order when the transaction commits, without any intervening memory accesses from any other processors (or threads), thus preserving transactional semantics. Specifically, when the transaction commits, all earlier (in program order) loads for which load-marks are held are placed in the memory order, then all earlier (in program order) stores for which store-marks are held are placed in the memory order, then all loads and stores within the transaction are placed in the memory order.

Embodiments of the present invention use the same rules to implement atomic instructions (such as read-modify-write) by viewing the load and store portions of the atomic as forming a (very short) transaction. Note that the rules do not require stores which are earlier than the atomic instruction to commit to the memory system before the atomic instruction commits. Rather, such earlier stores can simply hold their store-marks when the atomic instruction commits. As a result, processing atomic instructions does not require draining the store queue. Furthermore, embodiments of the present invention use the same rules to facilitate processor hardware executing speculatively and out-of-order. In other words, for these embodiments, hardware speculative execution is also viewed as a transaction.

Executing a Transaction

Figure 7:
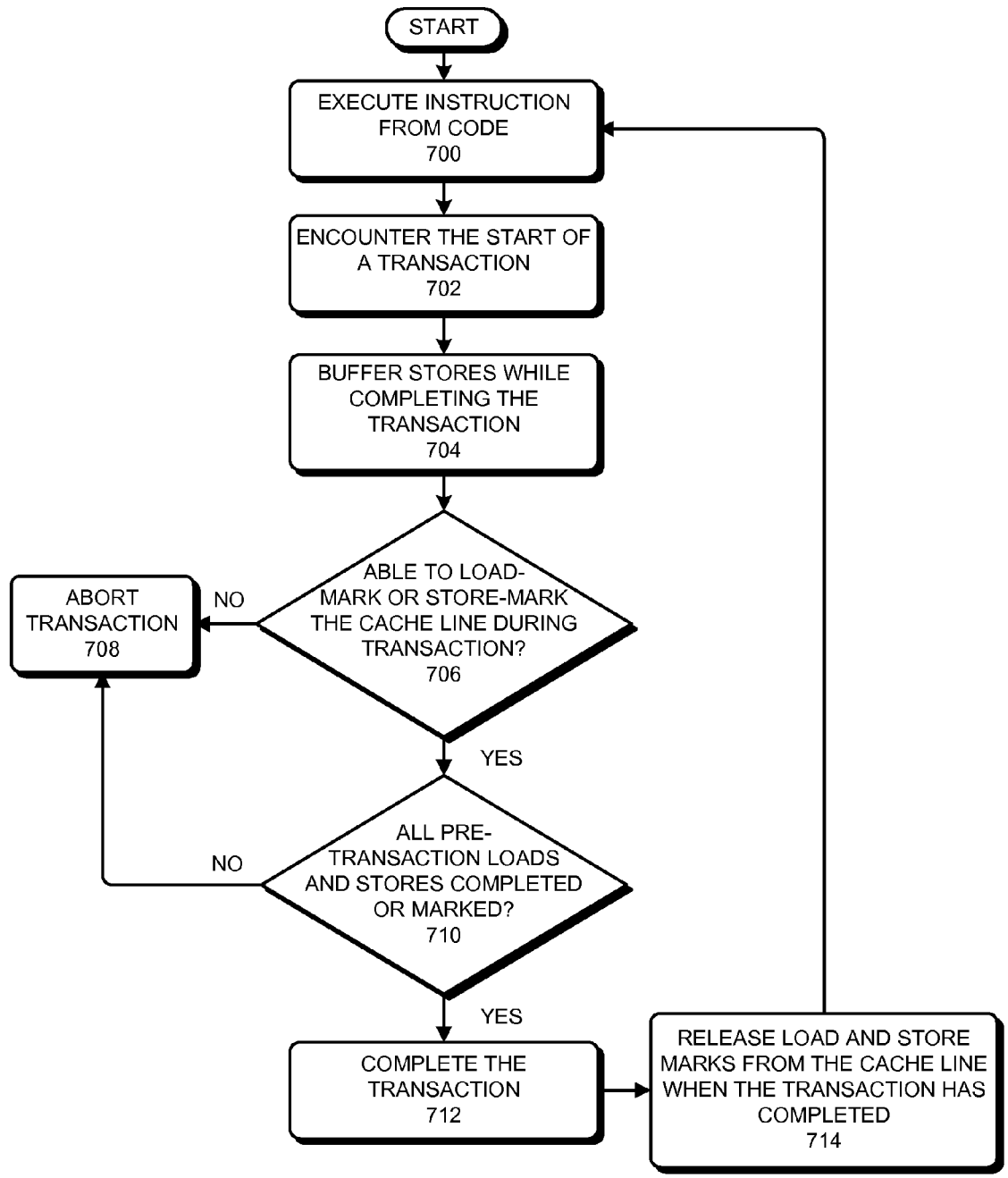
FIG. 7 presents a flow chart illustrating the process of performing a transaction in accordance with embodiments of the present invention.

FIG. 7 presents a flow chart illustrating the process of performing a transaction in accordance with embodiments of the present invention. The process starts with a thread executing instructions (step 700).

The thread then encounters the start of a transaction (step 702). For example, the transaction can be initiated by a start transactional execution ("STE") instruction, which puts the thread in transactional-execution mode. For a more detailed explanation of starting transactional execution see U.S. patent application Ser. No. 10/637,166, entitled "Start Transactional Execution (STE) Instruction to Support Transactional Program Execution," by inventors Marc Tremblay, Quinn A. Jacobson and Shailender Chaudhry, filed on 8 Aug. 2003, which is hereby incorporated by reference to explain the process of starting transactional execution. Alternatively a transaction can be defined to be an atomic operation, in which case the start of the transaction can be indicated by an atomic instruction, such as a read-modify-write instruction. Furthermore, a transaction can be defined as hardware speculative execution, in which case the start of the transaction can be indicated by the entry to the hardware speculative execution episode.

Before commencing the execution of the transaction, the thread sends a StartTrans packet (see Table 3) to L1 cache 102, indicating a timestamp (see Table 2) that the thread will place on load-marked cache lines during the transaction. The L1 cache then increments the TO_counter associated with the timestamp.

Upon entering the transaction, the system switches the transaction state indicator to "transaction pending," takes a checkpoint of the architectural state of the thread, and commences buffering of store operations encountered during the transaction (step 704).

During the transaction, the thread attempts to place a load-mark on all cache lines read by the thread and a store-mark on all cache lines written by the thread (step 706). If the thread is unable to place a load-mark or store-mark on a cache line, the transaction aborts (step 708). For example, if the transaction attempts to place a store-mark on a cache line that has already been load-marked or store-marked, the thread is unable to place the store-mark and the transaction aborts and the system restores the architectural state that was checkpointed at the start of the transaction.

Note that in order to protect marked cache lines from subsequent memory operations by other threads during the transaction, all load-marks and store-marks placed on cache lines during the transaction remain on the cache line until the transaction commits. In other words, the marking thread simultaneously holds all the load-marks and store-marks placed during the transaction when the transaction commits.

When the transaction has completed (as indicated by the completion of the atomic instruction, the return to non-speculative execution after a hardware speculative execution episode, or by the commit instruction at the end of transactional execution), the system prepares to commit the results of the transaction. Before committing the results of transactional execution, the system determines whether all loads that precede the transaction in program order have either been committed or have a read mark on a corresponding cache line. The system also determines whether all stores that precede the transaction in program order are either committed to memory prior to the transaction commit or have a write mark on a corresponding cache line (step 710). If not, the transaction aborts (step 708).

Otherwise, because the pre-transaction loads and stores either commit before the transaction or hold a load-mark or store-mark on an associated cache line, all reads and writes within the transaction can be committed when the transaction completes without any intervening memory accesses from any other thread. In this case, the system commits the results of the transaction by completing the stores buffered during the transaction (step 712).

After committing the results of the transaction, the thread sends a StopTrans packet to the L1 cache and releases any store-marks from any cache lines that were accessed during the transaction. L1 cache 102 then decrements the TO_counter corresponding to the timestamp used during the transaction. Next, the system returns the transaction state indicator to the "not-in-transaction" state (step 714). The system then returns to step 700 and continues to execute instructions from the program code.

Load-Marking Examples

The following sections present three examples of load-marking cache lines during a transaction in accordance with embodiments of the present invention. In the first example, all the load-marked cache lines remain in the L1 cache (i.e., no load-marked cache lines are evicted from the L1 cache) and threads that placed load-marks on cache lines in the L1 cache eventually quiesce (i.e., there is an interval of time when there are no threads executing a transaction). In the second example, the load-marking threads eventually quiesce, but one or more cache lines are evicted from the L1 cache during a thread's transaction. In the third example, the threads accessing the L1 cache do not quiesce and one or more cache lines are evicted from the L1 cache.

No Cache Lines Evicted and Threads Quiesce

The first example starts with processor core 101 executing instructions for threads THD1, THD2, and THD3. During operation, THD1, THD2, and THD3 each maintain a local set of load-mark variables as shown in Table 5 and L1 cache 102 maintains a local set of load-mark variables as shown in Table 6 (both tables include initial values for the variables). Note that the load-mark variables maintained by L1 cache 102 are prefaced with "L1" in the following section in order to simplify the description of these variables. For example, L1 cache 102's copy of timestamp[0] is called "L1_timestamp[0]." On the other hand, the threads' local variables (such as "parent_timestamp_select") are referred to without preface, although each thread accesses its own local copy.

TABLE 5

| Thread Load-Mark Variables |
| --- |
| overflow = 0 |
| parent_timestamp_select = 0 |
| parent_timestamp_map = 0 |

TABLE 6

| L1 Cache Load-Mark Variables |
| --- |
| L1_timestamp[0] = 0, L1_timestamp[1] = 1 |
| L1_timestamp_select = 0 |
| L1_TO_counter[0] = 0, L1_TO_counter[1] = 0 |
| L1_overflow[0] = 0, L1_overflow[1] = 0 |
| L1_parent_timestamp_select = 0 |
| L1_parent_timestamp_map[0] = 0, L1_parent_timestamp_map[1] = 0 |

Eventually THD1 commences execution of a transaction while THD2 and THD3 continue non-transactional execution. As THD1 commences execution of the transaction, THD1 sends a StartTrans packet to L1 cache 102. Within the packet, THD1 includes the index of the timestamp that THD1 will use for load-marking cache lines in L1 cache 102 during the transaction. In embodiments of the present invention, the timestamp index sent in the StartTrans packet is stored in the parent_timestamp_select variable maintained by THD1 (the initial value of which is 0).

THD1 also copies the parent_timestamp_select value into the parent_timestamp_map variable. The parent_timestamp_map variable retains the value that is in THD1's parent_timestamp_select as the transaction starts. THD1 retains this value in case L1 cache 102 sends a NewParentTimestampSelect packet to update THD1's parent timestamp_select during THD1's transaction. THD1 uses the parent_timestamp_map value in subsequent communications with L1 cache 102 (such as the StopTrans packet) during the transaction.

L1 cache 102 then receives the StartTrans packet from THD1. Using the timestamp index included in the StartTrans packet, L1 cache 102 increments L1_TO_counter[0] (from the initial value of 0 to 1). By incrementing L1_TO_counter[0], L1 cache 102 records that one thread is executing a transaction that is using timestamp[0].

As THD1 subsequently loads cache lines during the transaction, THD1 signals L1 cache 102 to load-mark the cache lines by placing a load-mark and the value in L1_timestamp[0] (initially 0) in the metadata for the cache line. THD1 uses the value of the local parent_timestamp_map as the index for the timestamp when signaling L1 cache 102 to load-mark cache lines during the transaction.

Note that although THD1 as well as THD2 and THD3 place load-marks as described in the previous sections of this disclosure, we assume for the purposes of illustration that none of the load-marked cache lines are evicted from L1 cache 102 during any of the thread's transactions.

As THD1 executes its transaction, THD2 commences the execution of a second transaction. Upon commencing the second transaction, THD2 sends a StartTrans packet to L1 cache 102. Within the StartTrans packet, THD2 indicates the timestamp index that THD2 will use for load-marking cache lines in L1 cache 102 during the transaction. The timestamp index sent in the StartTrans packet is stored in the parent_timestamp_select variable held by THD1 (the initial value of which is 0). THD2 also copies the parent_timestamp_select value into the parent_timestamp_map variable and uses the parent_timestamp_map variable in subsequent communications with L1 cache 102 (such as the StopTrans packet) during the transaction.

L1 cache 102 then receives the StartTrans packet from THD2 and increments L1_TO_counter[0] from the value of 1 to 2. By incrementing L1_TO_counter[0], L1 cache 102 records that a second thread is executing a second transaction using L1_timestamp[0].

As THD2 subsequently loads cache lines during the transaction, THD2 signals L1 cache 102 to load-mark the cache line by placing a load-mark and the value from L1_timestamp[0] in the metadata for the cache line.

THD3 then commences a third transaction while THD1 and THD2 execute their transactions. Upon commencing the third transaction, THD3 sends a StartTrans packet to L1 cache 102. Within the packet, THD3 indicates the timestamp index that THD3 will use for load-marking cache lines in L1 cache 102 during the transaction. The timestamp index sent in the StartTrans packet is stored in the parent_timestamp_select variable held by THD3 (the initial value of which is 0). THD3 also copies the parent_timestamp_select value into the parent_timestamp_map variable and uses the parent_timestamp_map variable in subsequent communications with L1 cache 102 (such as the StopTrans packet) during the transaction.

L1 cache 102 then increments L1_TO_counter[0] from 2 to 3, thereby recording that there are three threads which are executing transactions using L1_timestamp[0]. As THD3 subsequently loads cache lines during the transaction, THD3 signals L1 cache 102 to load-mark the cache line by placing a load-mark and the value from L1_timestamp[0] in the metadata for the cache line.

Note that although THD1-THD3 are placing load-marks on cache lines during their transactions, other threads (e.g., a fourth thread; THD4) can still load-mark the cache lines or load the value from the cache lines (i.e., other threads can read from the cache line). However, the system prevents other threads from storing values to the cache line or store-marking the cache line while the cache line is load-marked in order to avoid overwriting a cache line on which one or more threads depends.

THD2 then completes the second transaction while THD1 and THD3 continue to execute their transactions. As THD2 completes the second transaction, THD2 sends a StopTrans packet to L1 cache 102, including an indication of the index of the timestamp (0) that THD2 was using for load-marking cache lines during the transaction (recall that THD2 uses the value of the local parent_timestamp_map in the StopTrans packet).

L1 cache receives the StopTrans packet from THD2 and then decrements L1_TO_counter[0] from the value of 3 to 2. By decrementing L1_TO_counter[0], L1 cache 102 records that one less thread is executing a transaction using L1_timestamp[0].

In embodiments of the present invention, THD2 does not remove the load-marks from the cache lines that THD2 load-marked during the second transaction. Because the load-marks are left on the cache lines, THD2 is not required to return to each load-marked cache line to remove the marks. Therefore, THD2 is not required to keep a record of the addresses (such as the private buffer 109 used for the addresses of store-marks) of cache lines that were load-marked during the transaction. In embodiments of the present invention, subsequent store-marking threads remove the load-mark and timestamp from a given cache line before placing a store-mark on the cache line.

Although THD2 has completed the second transaction, THD1 and THD3 are still executing the first and third transactions respectively. While one or both of THD1 and THD3 are executing their transactions, THD2 could commence the execution of a new transaction (a fourth transaction). When starting the fourth transaction, as before, THD2 would send a StartTrans packet to L1 cache 102 with a timestamp index of 0 (corresponding to the value of THD2's parent_timestamp_select). L1 cache 102 would then increment L1_TO_counter[0] from 2 to 3, recording that there are three threads which are executing transactions using a timestamp index of 0. THD2 would subsequently load-mark cache lines loaded during the transaction by placing a load-mark and the value of L1_timestamp[0] in metadata for the cache lines. However, for the purposes of illustration, we assume that THD2 does not commence a fourth transaction, but instead continues non-transactional execution.

Eventually, THD1 and THD3 also complete their transactions. As when THD2 completed the second transaction, THD1 and THD3 both send a StopTrans packet to L1 cache 102, including indications of the index of the timestamp that the threads were using for load-marking cache lines during their transactions. L1 cache 102 then decrements L1_TO_counter[0] from the value of 2 to 1 and then from 1 to 0. By decrementing L1_TO_counter[0], L1 cache 102 records that two less threads are executing a transaction using timestamp[0].

As with THD2, either THD1 or THD3 could commence the execution of a subsequent transaction while the other thread was still executing a transaction using L1_timestamp[0] to load-mark cache lines (e.g., THD1 could commence a subsequent transaction before THD3 had completed its transaction). If either thread did commence a subsequent transaction, that thread would use L1_timestamp[0] when load-marking cache lines. This pattern could continue indefinitely—as long as one thread or another is executing a transaction, the timestamp remains at index 0 and any thread executing a transaction load-marks cache lines using the value in L1_timestamp[0]. In this case, L1_TO_counter[0] is incremented as threads commence transactions and decremented as threads complete transactions, but always remains at some value greater than 0.

For the purposes of illustration, we assume that neither THD1 nor THD3 commences a subsequent transaction. Hence, all the threads have quiesced (i.e., completed their transactions). When the threads have quiesced, L1 cache 102 determines that the L1_TO_counter corresponding to the active timestamp (in this case L1_TO_counter[0]) has been decremented back to 0. L1 cache 102 then switches to a new timestamp value by updating the L1_timestamp_select variable from 0 to 1. After L1 cache 102 switches to the new timestamp value, the active timestamp is L1_timestamp[1]=1.

Note that a timestamp is considered "stale" if the cache line's timestamp differs from the corresponding timestamp at the given level of cache and/or the corresponding count is equal to zero. In this case, because the current timestamp is L1_timestamp[1] and the L1_T0_counter is equal to zero, the load-marks on cache lines that contain the old timestamp value of 0 are considered stale. When a load-mark on a cache line is stale, threads are not prevented from storing values to or placing a store-mark on the cache line (see FIGS. 5A and 5C).

Along with updating the timestamp_select value, L1 cache 102 increases L1_timestamp[0] from 0 to 2 (thereby preserving the computation of timestamp index, as mentioned above). Hence, if L1 cache 102 eventually switches back to a timestamp index of 0, L1 cache 102 uses "2" as the timestamp value when load-marking cache lines.

In embodiments of the present invention, L1 cache 102 sends a NewParentTimestampSelect packet to the threads indicating that L1 cache 102 switched to a new L1_timestamp_select value. The threads store the updated value in their local parent_timestamp_select variable. Hence, if a thread subsequently sends a StartTrans packet to L1 cache 102 to start a transaction, the thread includes the timestamp index of 1.

Table 7 illustrates the values of the load-mark variables for the threads and Table 8 illustrates that value of the load-mark variables for L1 cache 102 following the exemplary transaction in accordance with embodiments of the present invention. Note that the parent_timestamp_select in the threads is now 1, indicating that the threads will use timestamp index 1 when starting new transactions. In addition, L1_timestamp[0]=2 after being incremented when the threads quiesced. Furthermore, L1_timestamp_select=1, indicating that the active timestamp index in L1 cache 102 is 1.

TABLE 7

Thread Load-Mark Variables overflow = 0
parent_timestamp_select = 1
parent_timestamp_map = 0

TABLE 8

L1 Cache Load-Mark Variables

L1_timestamp[0] = 2, L1_timestamp[1] = 1
L1_timestamp_select = 1
L1_TO_counter[0] = 0, L1_TO_counter[1] = 0
L1_overflow[0] = 0, L1_overflow[1] = 0
L1_parent_timestamp_select = 0
L1_parent_timestamp_map[0] = 0, L1_parent_timestamp_map[1] = 0

Load-Marked Cache Line Evicted

The second example starts with a thread THD1 executing instructions on processor core 101. During operation, THD1 maintains a local set of load-mark variables as shown in Table 9; L1 cache 102 maintains a local set of load-mark variables as shown in Table 10; and L2 cache 105 maintains a local set of load-mark variables as shown in Table 11 (all tables also include initial values for the variables). Note that the load-mark variables maintained by L1 cache 102 are prefaced with "L1" and the load-mark variables in L2 cache 105 are prefaced with "L2" in the following section in order to simplify the description of these variables. For example, L1 cache 102's copy of timestamp[0] is called "L1_timestamp[0]."

TABLE 9

Thread Load-Mark Variables overflow = 0
parent_timestamp_select = 0
parent_timestamp_map = 0

TABLE 10

L1 Cache Load-Mark Variables

L1_timestamp[0] = 0, L1_timestamp[1] = 1
L1_timestamp_select = 0
L1_TO_counter[0] = 0, L1_TO_counter[1] = 0
L1_overflow[0] = 0, L1_overflow[1] = 0
L1_parent_timestamp_select = 0
L1_parent_timestamp_map[0] = 0, L1_parent_timestamp_map[1] = 0

TABLE 11

L2 Cache Load-Mark Variables

L2_timestamp[0] = 0, L2_timestamp[1] = 1
L2_timestamp_select = 0
L2_TO_counter[0] = 0, L2_TO_counter[1] = 0
L2_overflow[0] = 0, L2_overflow[1] = 0
L2_parent_timestamp_select = 0
L2_parent_timestamp_map[0] = 0, L2_parent_timestamp_map[1] = 0

Eventually THD1 commences execution of a transaction. As THD1 commences execution of the transaction, THD1 sends a StartTrans packet to L1 cache 102, indicating the parent_timestamp_select value of 0 as the timestamp index.

THD1 also copies the parent_timestamp_select value into the parent_timestamp_map variable. The parent_timestamp_map variable retains the value that is in THD1's parent_timestamp_select as the transaction starts. THD1 retains this value in case L1 cache 102 sends a NewParentTimestampSelect packet to update THD1's parent_timestamp_select during THD1's transaction. THD1 uses the parent_timestamp_map value in subsequent communications with L1 cache 102 (such as the StopTrans packet) during the transaction.

L1 cache 102 then receives the StartTrans packet from THD1. Using the timestamp index included in the StartTrans packet, L1 cache 102 increments L1_TO_counter[0] (from the initial value of 0 to 1). By incrementing L1_TO_counter[0], L1 cache 102 records that one thread is executing a transaction that is using timestamp[0].

As THD1 subsequently loads cache lines during the transaction, THD1 signals L1 cache 102 to load-mark the cache lines by placing a load-mark and the value in L1_timestamp[0] (initially 0) in the metadata for the cache line. THD1 uses the parent_timestamp_map as the index for the timestamp when signaling L1 cache 102 to place load-marks on cache lines loaded during the transaction.

While THD1 is executing the transaction, the system encounters a condition under which a cache line load-marked by THD1 during the transaction is evicted from L1 cache 102 to L2 cache 105 (i.e., L1 cache 102 "overflows"). Because THD1 is still executing the transaction, the thread must retain the load-mark in the next level of the memory hierarchy to prevent any threads from storing to or store-marking the cache line. However, the load-mark in L1 cache 102 does not uniquely identify THD1 as the load-marking thread, so L2 cache 105 maintains a separate load-mark on the evicted cache line. Consequently, before evicting the cache line to L2 cache 105, L1 cache 102 starts its own "transaction" with L2 cache 105.

Note that a transaction involving L1 cache 102 is different from a transaction involving a thread. For a thread, a transaction is defined by the underlying type of execution (e.g., an atomic instruction, an episode of hardware speculative execution, or a software transaction). On the other hand, for L1 cache 102, a transaction starts when the first load-marked cache line is evicted while at least one thread is still executing a transaction that depends on the same timestamp and the transaction ends when the thread completes its transaction or, if there is more than one thread executing a transaction, when the threads quiesce.

When starting the transaction, L1 cache 102 sends a StartTrans packet to L2 cache 105, indicating the L1_parent_timestamp_select value of 0 as the timestamp index. L1 cache 102 then copies the L1_parent_timestamp_select value into the position in the L1_parent_timestamp_map array corresponding to the L1_timestamp_select value (i.e., L1 cache 102 copies the L1_parent_timestamp_select value of 0 into L1_parent_timestamp_map[0]). L1 cache 102 performs the copy operation in order to retain the value of the L1_parent_timestamp_select used when starting the transaction in case L2 cache 105 sends a NewParentTimestampSelect packet during L1 cache 102's transaction, thereby overwriting the L1_parent_timestamp_select value. L1 cache 102 uses the L1_parent_timestamp_map value in subsequent communications to L2 cache 105 (such as in the StopTrans packet).

L1 cache 102 also asserts an overflow flag corresponding to the L1_timestamp_select value (i.e., L1 cache 102 asserts L1_overflow[0]). By asserting the overflow flag, L1 cache 102 records that at least one cache line load-marked using a corresponding L1_timestamp_select value has been evicted to L2 cache 105.

L2 cache 105 then receives the StartTrans packet from L1 cache 102 and increments the L2_TO_counter[0] from the initial value of 0 to 1. By incrementing L2_TO_counter[0], L2 cache 105 records that L1 cache 102 is engaged in a transaction for which evicted load-marked cache lines are load-marked in L2 cache 105 using L2_timestamp[0].

When L1 cache 102 subsequently evicts load-marked cache lines during L1 cache 102's transaction, L1 cache 102 sends an EvictMarkedLine packet with the address of the evicted cache line and the timestamp index of 0 indicated, thereby signaling L2 cache 105 to load-mark the cache line in L2 cache 105. (When L1_overflow[0] is asserted, L1 cache 102 does not send the StartTrans packet as cache lines are evicted.)

Eventually, THD1 completes its transaction and sends a StopTrans packet to L1 cache 102, including the value of its parent_timestamp_select variable (i.e., 0) that THD1 was using for load-marking cache lines in L1 cache 102 during the transaction. L1 cache 102 then decrements L1_TO_counter[0] from the value of 1 to 0.

L1 cache 102 determines that L1_TO_counter[0] has been decremented to 0 and switches to a new timestamp value by updating L1_timestamp_select from 0 to 1. After L1 cache 102 switches to the new timestamp value, the active timestamp for L1 cache 102 is L1_timestamp[1]=1.

Along with updating the L1_timestamp_select value, L1 cache 102 increments L1_timestamp[0] from 0 to 2. Hence, if L1 cache 102 eventually switches back to L1_timestamp[0], L1 cache 102 will use "2" as the timestamp value when load-marking threads in L1 cache 102.

In embodiments of the present invention, L1 cache 102 sends a NewParentTimestampSelect packet to THD1 indicating that L1 cache 102 switched to a new timestamp. THD1 stores the updated value in its local parent_timestamp_select variable. Hence, if THD1 subsequently sends a StartTrans packet to start a transaction, THD1 includes the parent_timestamp_select value of 1.

Because L1_overflow[0] is asserted, indicating that at least one load-marked cache line was evicted during the transaction, L1 cache 102 also sends a StopTrans packet to L2 cache 105, including the L1_parent_timestamp_map value corresponding to the index of the timestamp that L1 cache 102 was using to load-mark evicted cache lines in L2 cache 105 during the transaction (i.e., L1_parent_timestamp_map[0]). After sending the StopTrans packet, L1 cache 102 deasserts L1_overflow[0].

L2 cache 105 receives the StopTrans packet and decrements L2_TO_counter[0] from 1 to 0, indicating that no L1 caches are currently executing transactions. Because L2_TO_counter[0] has been decremented to 0, L2 cache 102 switches to a new timestamp value by updating L2_timestamp_select from 0 to 1. After L2 cache 105 switches to the new timestamp value, the active timestamp for L2 cache 105 is L2_timestamp[1]=1.

Along with updating the L2_timestamp_select value, L2 cache 102 increments L2_timestamp[0] from 0 to 2. Hence, if L2 cache 105 eventually switches back to L2_timestamp[0], L2 cache 105 will use "2" as the timestamp value when load-marking cache lines in L2 cache 105.

In embodiments of the present invention, L2 cache 105 sends a NewParentTimestampSelect packet to L1 cache 102 (and any other L1 caches) indicating that L2 cache 105 switched to a new timestamp. L1 cache 102 stores the updated value in its local parent_timestamp_select variable. Hence, if L1 cache 102 subsequently sends a StartTrans packet to start a transaction, L1 cache 102 includes the timestamp index of 1.

In embodiments of the present invention, if load-marked cache lines have overflowed from L2 cache 105 during L1 cache 102's transaction, L2 cache 105 will have started its own transaction with the next level of the memory hierarchy (in the same way as L1 cache 102 started the transaction with L2 cache 105) and asserted L2_overflow[0]. If L2_overflow [0] is asserted when L1 cache 102's transaction ends, L2 cache 105 stops its transaction with the next level of the memory hierarchy (in the same way as L1 cache 102 stopped the transaction with L2 cache 105). This pattern applies to all levels of a memory hierarchy. In other words, as any level of the memory hierarchy evicts load-marked cache lines to a parent during a child's transaction, the level of the memory hierarchy starts a transaction with the parent to preserve the load-marking at the parent's level of the memory hierarchy.

Threads do not Quiesce and Load-Marked Cache Line Evicted

The third example starts with threads THD1 and THD2 executing instructions on processor core 101. During operation, THD1 and THD2 each maintain a local set of load-mark variables as shown in Table 12; L1 cache 102 maintains a local set of load-mark variables as shown in Table 13; and L2 cache 105 maintains a local set of load-mark variables as shown in Table 14 (all tables include initial values for the variables). Note that the load-mark variables maintained by L1 cache 102 are prefaced with "L1" and the load-mark variables in L2 cache 105 are prefaced with "L2" in the following section in order to simplify the description of these variables. For example, L1 cache 102's copy of timestamp[0] is called "L1_timestamp[0]." On the other hand, the thread's local variables (such as "parent_timestamp_select") are referred to without preface, although each thread accesses its own local copy of the variables.

TABLE 12

Thread Load-Mark Variables overflow = 0
parent_timestamp_select = 0
parent_timestamp_map = 0

TABLE 13

L1 Cache Load-Mark Variables

L1_timestamp[0] = 0, L1_timestamp[1] = 1
L1_timestamp_select = 0
L1_TO_counter[0] = 0, L1_TO_counter[1] = 0
L1_overflow[0] = 0, L1_overflow[1] = 0
L1_parent_timestamp_select = 0
L1_parent_timestamp_map[0] = 0, L1_parent_timestamp_map[1] = 0

TABLE 14

L2 Cache Load-Mark Variables

L2_timestamp[0] = 0, L2_timestamp[1] = 1
L2_timestamp_select = 0
L2_TO_counter[0] = 0, L2_TO_counter[1] = 0
L2_overflow[0] = 0, L2_overflow[1] = 0
L2_parent_timestamp_select = 0
L2_parent_timestamp_map[0] = 0, L2_parent_timestamp_map[1] = 0

Eventually THD1 commences execution of a transaction. As THD1 commences execution of the transaction, THD1 sends a StartTrans packet to L1 cache 102, indicating the parent_timestamp_select value of 0 as the timestamp index. THD1 also copies the parent_timestamp_select value into the parent_timestamp_map variable. THD1 subsequently uses the parent_timestamp_map value in communications with L1 cache 102 (such as the StopTrans packet) during the transaction.

L1 cache 102 then receives the StartTrans packet from THD1. Using the timestamp index included in the StartTrans packet, L1 cache 102 increments L1_TO_counter[0] (from the initial value of 0 to 1). By incrementing L1_TO_counter [0], L1 cache 102 records that one thread is executing a transaction that is using timestamp[0].

As THD1 subsequently loads cache lines during the transaction, THD1 signals L1 cache 102 to load-mark the cache lines by placing a load-mark and the value in L1_timestamp [0] (initially 0) in the metadata for the cache line.

As THD1 executes its transaction, THD2 commences the execution of a second transaction. Upon commencing the second transaction, THD2 sends a StartTrans packet to L1 cache 102. Within the packet, THD2 indicates the parent_timestamp_select value of 0 as the timestamp index. THD2 also copies the parent_timestamp_select value into the parent_timestamp_map variable. THD2 subsequently uses the parent_timestamp_map value in communications with L1 cache 102 (such as the StopTrans packet) during the transaction.

L1 cache 102 then receives the StartTrans packet from THD2 and increments L1_TO_counter[0] from the value of 1 to 2. By incrementing L1_TO_counter[0], L1 cache 102 records that a second thread is executing a transaction using L1_timestamp[0].

As THD2 subsequently loads cache lines during the transaction, THD2 signals L1 cache 102 to load-mark the cache line by placing a load-mark and the value from L1_timestamp [0] in the metadata for the cache line.

Assuming that THD1 and THD2 do not quiesce, the threads can continue to load-mark cache lines using the same timestamp (i.e., timestamp[0]) during a large number of transactions. In this situation, because the threads do not remove the load-marks from cache lines following a transaction, the number of load-marks left over from past transactions can grow significantly. Eventually, there can be enough load-marks (both current and left over) on the cache lines that the load-marks begin to markedly impact stores or store-marking operations for the cache line.

In order to reduce the impact of load-marks from past transactions, embodiments of the present invention switch to a new timestamp index when a predetermined event occurs. Although the threads quiescing remains such an event, these embodiments can switch to a new timestamp index in cases where the threads do not quiesce (i.e., during one or more threads' transactions). In these embodiments, the predetermined event can be: (1) a predetermined amount of time passing since the first transaction using the timestamp index started; (2) a predetermined number of cache lines load-marked using the timestamp; (3) a predetermined number of StartTrans packets or a StopTrans packets received; (4) a predetermined number of unique store-marking operations fail due to the presence of a load-mark; or (5) another suitable predetermined event. Recall that a timestamp is considered "stale" if the cache line's timestamp differs from the corresponding timestamp at the given level of cache and/or the corresponding count is equal to zero and that when a load-mark on a cache line is stale, threads are not prevented from storing values to or placing a store-mark on the cache line.

Using L1 cache 102 as an example and assuming that both THD1 and THD2 are still executing transactions that depend on timestamp index 0, the switch to another timestamp index occurs as follows. First the L1 cache 102 detects that the predetermined event has occurred. For the embodiments that use the number of StartTrans packets received as the event, the predetermined event could be detected when a 5-bit StartTrans packet counter overflows (after 32 transactions have started). Upon detecting the predetermined event, L1 cache 102 switches to a new timestamp value by switching the L1_timestamp_select from 0 to 1, making L1 cache 102's active timestamp L1_timestamp[1]=1.

Interaction between L1 Cache and Threads after a New Timestamp is Selected

After switching to the new timestamp_select value, L1 cache 102 sends a NewParentTimestampSelect packet to THD1 and THD2 indicating that L1 cache 102 switched to a new timestamp. The threads store the updated value in their local parent_timestamp_select variables. Hence, if THD1 or THD2 subsequently sends a StartTrans packet to L1 cache 102 to start a new transaction, the thread includes the timestamp index of 1.

Note that THD1 and THD2 still maintain a copy of the old timestamp index in their local parent_timestamp_map variable. Recall that the threads use the index stored in the parent_timestamp_map for communications with the parent (aside from the StartTrans packet) during a transaction. Consequently, until the threads start a new transaction and overwrite the parent_timestamp_map, the threads continue to use the old timestamp index for communications with L1 cache 102.

Because threads THD1 and THD2 are still executing transactions that depend on L1_timestamp[0] (i.e., the old timestamp value), the value for L1_TO_counter[0] remains at 2.

Hence, L1 cache 102 does not yet increment L1_timestamp[0].

Eventually, THD1 completes its transaction and sends a StopTrans packet to L1 cache 102, including the index of the timestamp (i.e., "0" from the parent_timestamp_map variable) that THD1 was using to load-mark cache lines during the transaction. In response, L1 cache 102 decrements L1_TO_counter[0] from 2 to 1.

While THD2 continues with its original transaction, THD1 subsequently commences execution of a new transaction. As THD1 commences execution of the new transaction, THD1 sends a StartTrans packet to L1 cache 102, indicating the newly updated parent_timestamp_select value of 1 as the timestamp index. THD1 also copies the parent_timestamp_select value into the parent_timestamp_map variable. THD1 subsequently uses the parent_timestamp_map value in communications with L1 cache 102 (such as the StopTrans packet) during the new transaction.

L1 cache 102 then receives the StartTrans packet from THD1. Using the timestamp index included in the StartTrans packet, L1 cache 102 increments L1_TO_counter[1] (from the initial value of 0 to 1). By incrementing L1_TO_counter[1], L1 cache 102 records that one thread is executing a transaction that is using timestamp[1].

As THD1 subsequently loads cache lines during the new transaction, THD1 signals L1 cache 102 to load-mark the cache lines by placing a load-mark and the value in L1_timestamp[1] in the metadata for the cache line.

Eventually, THD2 completes its transaction and sends a StopTrans packet to L1 cache 102, including the index of the timestamp (i.e., "0" from the parent_timestamp_map variable) that THD2 was using to load-mark cache lines during the transaction. In response, L1 cache 102 decrements L1_TO_counter[0] from 1 to 0.

When L1_TO_counter[0] is decremented to 0, L1 cache 102 increments L1_timestamp[0] from 0 to 2. Hence, if L1 cache 102 eventually switches back to L1_timestamp[0], L1 cache 102 will use "2" as the timestamp value when load-marking cache lines.

THD1 and THD2 then continue to execute instructions on processor core 101.

Interaction between L1 Cache and L2 Cache after a New Timestamp is Selected

After switching to the new timestamp_select value (as described in the "Threads do not Quiesce" section above), L1 cache 102 can potentially load-mark cache lines with load-marks that use either L1_timestamp[0] (from already-started transactions) or L1_timestamp[1]. Consequently, cache lines that include either of the timestamp values can potentially be evicted from L1 cache 102 to L2 cache 105. The following sections describe the interaction between L1 cache 102 and L2 cache 105 when cache lines are evicted when more than one timestamp is in use in L1 cache 102.

Note that we use L1 cache 102 and L2 cache 105 for the purposes of illustration, but a similar process can occur between other levels of the memory hierarchy.

Recall that transactions started between L1 cache 102 and L2 cache 105 correspond to the index of the timestamp value that is in the metadata for the evicted cache lines (i.e., the index of the load-marked cache lines is used to track transactions). Hence, because L1 cache 102 contains load-marked cache lines that are using different timestamp indices, L1 cache 102 engages in simultaneous transactions. For example, a first transaction can be started when a first load-marked cache line using a first timestamp index is evicted and a second transaction can be started when a first load-marked cache line using a second timestamp index is evicted.

For the purposes of illustration, we assume that THD1 is executing the original transaction using the timestamp index of 0, while THD2 has completed the original transaction and started another transaction that uses the updated timestamp of 1 (i.e., the new timestamp index in L1 cache 102). Hence, THD1 load-marks cache lines in L1 cache 102 using timestamp[0], while THD2 load-marks cache lines using timestamp[1]. We also assume that no cache lines have yet been evicted from L1 cache 102 to L2 cache 105.

Then, while THD1 and THD2 are executing their transactions, the system encounters a condition under which a cache line load-marked by THD1 (using timestamp[0]) is evicted from L1 cache 102 to L2 cache 105 (i.e., L1 cache 102 "overflows"). Before evicting the cache line to L2 cache 105, L1 cache 102 starts a transaction with L2 cache 105.

Because L1 cache 102 has used more than one timestamp to load-mark cache lines, starting a transaction differs from starting a transaction in the case where L1 cache 102 has used only one timestamp. As with a single-timestamp transaction, L1 cache 102 sends a StartTrans packet to L2 cache 105, indicating the L1_parent_timestamp_select value as the timestamp index (initially 0). However, unlike with single-timestamp transactions, L1 cache 102 copies the L1_parent_timestamp_select value into the L1_parent_timestamp_map array in a position that corresponds to the index of the timestamp in the load-mark on the cache line (instead using the L1_timestamp_select value). In other words, because the index of the timestamp in the metadata for the cache line and the active L1_timestamp_select may differ, L1 cache 102 does not copy the L1_parent_timestamp_select into the position in the L1_parent_timestamp map array indicated by the L1_timestamp_select value. Instead, L1 cache 102 determines the position in the L1_parent_timestamp_map array by calculating the timestamp index of the timestamp in the metadata for the cache line. Recall that potential valid values for the timestamps are designated so that the modulus operation returns the index of the timestamp in the metadata for the cache line. Hence, the L1_parent_timestamp_select value is written into the L1_parent_timestamp_map array at a position (meta_timestamp[pa]% 2). In this case, the index of the timestamp is 0, so the parent_timestamp_select value is written into L1_parent_timestamp_map[0]. L1 cache 102 uses the L1_parent_timestamp_map[0] value in subsequent communications to L2 cache 105 (such as in the StopTrans packet) for cache lines that are load-marked using a timestamp with the index of 0.

L1 cache 102 also asserts an overflow flag corresponding to the index of the timestamp in the metadata for the evicted load-marked cache line (instead of the index indicated in the L1_timestamp_select value for the reason cited above). In this case, the index of the timestamp is 0, so L1 cache 102 asserts overflow[0]. By asserting overflow[0], L1 cache 102 records that at least one cache line that was load-marked using timestamp[0] has been evicted to L2 cache 105.

L2 cache 105 then receives the StartTrans packet from L1 cache 102 and increments the L2_TO_counter corresponding to the index of the timestamp in the metadata for the evicted load-marked cache line (i.e., incrementing L2_TO_counter[0] from 0 to 1). By incrementing the L2_TO_counter[0], L2 cache 105 records that L1 cache 102 is engaged in a transaction for which evicted load-marked cache lines are load-marked in L2 cache 105 using L2_timestamp[0].

When L1 cache 102 subsequently evicts cache lines load-marked using timestamp[0] during L1 cache 102's transaction, L1 cache 102 sends an EvictMarkedLine packet with the address of the evicted cache line and the timestamp index of L1_parent_timestamp_map[0] indicated, thereby signaling L2 cache 105 to load-mark the cache line in L2 cache 105. (When L1_overflow[0] is asserted, L1 cache 102 does not send the StartTrans packet as load-marked cache lines using timestamp[0] are evicted.)

The system subsequently encounters a condition under which a cache line load-marked by THD2 (using timestamp [1]) is evicted from L1 cache 102 to L2 cache 105. Before evicting the cache line to L2 cache 105, L1 cache 102 starts a second transaction with L2 cache 105.

When starting the second transaction, L1 cache 102 sends a StartTrans packet to L2 cache 105, indicating the L1_parent_timestamp_select value of 0 as the timestamp index. L1 cache 102 also copies the L1_parent_timestamp_select value into the L1_parent_timestamp_map array in a position that corresponds to the index of the timestamp in the load-mark on the cache line. In this case, the index of the timestamp is 1, so L1_parent_timestamp_map[1]=0. L1 cache 102 uses the L1_parent_timestamp_map[1] value in subsequent communications to L2 cache 105 (such as in the StopTrans packet) for cache lines that are load-marked using a timestamp with the index of 1.

L1 cache 102 also asserts an overflow flag corresponding to the index of the timestamp in the metadata for the evicted load-marked cache line. In this case, the index of the timestamp is 1, so L1 cache 102 asserts overflow[1]. By asserting overflow[1], L1 cache 102 records that at least one cache line that was load-marked using timestamp[1] has been evicted to L2 cache 105.

L2 cache 105 then receives the StartTrans packet from L1 cache 102 and increments the L2_TO_counter corresponding to the indicated timestamp index (i.e., incrementing L2_TO_counter[0] from 1 to 2). By incrementing the L2_TO_counter[0], L2 cache 105 records that L1 cache 102 is engaged in a second transaction for which evicted load-marked cache lines are load-marked in L2 cache 105 using L2_timestamp[0]. (Recall that although the index of the evicted load-marked cache line in L1 cache 102 was 1, the parent_timestamp_select value was 0, so L1 cache 102's transaction was started with a timestamp index of 0.)

When L1 cache 102 subsequently evicts cache lines load-marked using timestamp[1] during L1 cache 102's transaction, L1 cache 102 sends an EvictMarkedLine packet with the address of the evicted cache line and the timestamp index of L1_parent_timestamp_map[1] indicated, thereby signaling L2 cache 105 to load-mark the cache line in L2 cache 105. (When L1_overflow[1] is asserted, L1 cache 102 does not send the StartTrans packet as load-marked cache lines using timestamp[1] are evicted.)

Eventually, THD1 completes its transaction and sends a StopTrans packet to L1 cache 102, including the index of the timestamp (i.e., "0" from the parent_timestamp_map variable) that THD1 was using for load-marking cache lines in L1 cache 102 during the transaction. In response, L1 cache 102 decrements L1_TO_counter[0] from 1 to 0.

When L1_TO_counter[0] is decremented to 0, L1 cache 102 increments L1_timestamp[0] from 0 to 2. Hence, if L1 cache 102 eventually switches back to L1_timestamp[0], L1 cache 102 will use "2" as the timestamp value when load-marking cache lines.

Because L1_overflow[0] is asserted, indicating that at least one cache line load-marked using timestamp[0] was evicted during the transaction, L1 cache 102 also sends a StopTrans packet to L2 cache 105, including the L1_parent_timestamp_map value (i.e., L1_parent_timestamp_map[0]=0). After sending the Stop-Trans packet, L1 cache 102 deasserts L1_overflow[0].

L2 cache 105 receives the StopTrans packet and decrements L2_TO_counter[0] from 2 to 1, indicating that only one L1 cache timestamp is currently executing transactions using L2_timestamp[0].

Note that THD2 eventually completes its transaction. When THD2 completes its transaction, the levels of the memory hierarchy are updated in the same fashion as when THD1 completed its transaction. Recall that although THD2 eventually completes its transaction, the threads in this example never quiesce (i.e., THD1 or THD2 is always executing a transaction). In embodiments of the present invention L2 cache (and other levels of the memory hierarchy) support the same timestamp switching as the L1 cache (described in the "Threads do not Quiesce" section above). Hence, even though threads THD1 and THD2 never quiesce, L2 cache 105 eventually updates L2_timestamp_select. L2 cache 102 then communicates the change to L1 cache 102 in a similar manner to the communication between L1 cache 102 and the threads in the preceding sections.

Alternative Embodiments

Embodiments of the present invention allow a thread to place a store-mark on a load-marked cache line when (1) there is only one load-mark on the cache line and (2) the load-mark was placed by the thread that is attempting to store-mark the cache line. Because the store-mark is more restrictive to accesses by other threads, the placement of a store-mark on a previously load-marked cache line can be regarded as an "upgrade" of a thread's load-mark.

In these embodiments, the metadata corresponding to load-marked cache lines includes an indication of the number of load-marks on the cache line and an identifier of the thread that placed the load-mark on the cache line. For example, the metadata for the load-marked cache line may include a count of load-marking threads, as well as a field that can be used to determine which thread set the first load mark. Alternatively, a load-marked cache line may include a metadata field that is clear (e.g., all bits set to 0) when there is no load-mark on the cache line, then contains an identification of the load-marking thread when the first load-mark has been placed on the cache line, and then contains an invalid value (e.g. all bits set to 1) when more than one load-mark has been placed on the cache line.

Recall that before placing a store-mark on a cache line, the thread attempting to place a store-mark first obtains a copy of the cache line with exclusive access to the cache line (see FIG. 6C). Hence, the system provides the cache line including metadata to the local cache. Before placing a store-mark on a given cache line in a given cache, the system determines if there is one load-mark on the cache line. If so, the system determines if the store-marking thread placed the load-mark on the cache line. When making this determination, the system checks the metadata for the cache line to determine if the metadata indicates that the load-mark was placed by the store-marking thread. If there is only one load-mark on the cache line and that load-mark was placed by the store-marking thread, the system places a store-mark on the cache line. In this case, one thread then simultaneously has both a load-mark and a store-mark on the cache line, providing that thread with exclusive access to the cache line.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for marking cache lines, comprising:
starting a transaction for a thread, wherein starting the transaction involves recording the value of an active timestamp;
incrementing a transaction or overflow counter (TO_counter) corresponding to the recorded value;
placing load-marks on cache lines which are loaded during the transaction, wherein placing the load-marks involves writing the recorded value into metadata corresponding to the cache lines;
upon completing the transaction for the thread,
decrementing the TO_counter corresponding to the recorded value, and
resuming non-transactional execution for the thread without removing the load-marks from cache lines which were load-marked during the transaction; and
incrementing the value of the corresponding timestamp when the TO_counter is decremented to zero.

2. The method of claim 1, wherein during the transaction for the thread the method further comprises:
starting at least one additional transaction for at least one other thread, wherein starting the at least one additional transaction involves recording the value of an active timestamp;
incrementing the TO_counter corresponding to the recorded value associated with the at least one additional transaction;
placing load-marks on cache lines which are loaded during the at least one additional transaction, wherein placing the load-marks involves writing the recorded value into metadata corresponding to the cache lines; and
upon completing the at least one additional transaction,
decrementing the TO_counter corresponding to the recorded value; and
resuming non-transactional execution for the at least one other thread without removing the load-marks from cache lines which were load-marked during the at least one additional transaction.

3. The method of claim 2, wherein during the transaction or the at least one additional transaction, upon evicting a first load-marked cache line to a next level of a memory hierarchy, the method further comprises:
recording the value of an active timestamp for the next level of memory hierarchy;
incrementing a TO_counter for the next level of the memory hierarchy corresponding to the recorded value of the active timestamp; and
for the first load-marked cache line and any subsequent load-marked cache lines evicted to the next level of the memory hierarchy during the transaction or the at least one additional transaction, placing a load-mark on each evicted cache line at the next level of the memory hierarchy, wherein placing the load-mark involves writing the recorded value of the active timestamp into metadata associated with the cache line at the next level of the memory hierarchy.

4. The method of claim 3, wherein upon evicting the first load-marked cache line the method further comprises:
asserting an overflow flag corresponding to the recorded value used to load-mark the evicted cache line;
wherein when the transaction and the at least one additional transaction complete, if the overflow flag is set,
decrementing the TO_counter at the next level of the memory hierarchy, and
resuming non-transactional execution for the threads without removing the load-marks from cache lines which were load-marked at the next level of the memory hierarchy.

5. The method of claim 3, wherein the method further comprises:
maintaining an active timestamp and an inactive timestamp at each level of the memory hierarchy;
recording the value of the active timestamp as a transaction starts for a level of the memory hierarchy and using the recorded value of the active timestamp to load-mark cache lines during the transaction; and
upon the occurrence of a predetermined condition at the corresponding level of the memory hierarchy, switching the active timestamp to be inactive and the inactive timestamp to be active.

6. The method of claim 5, wherein the predetermined condition includes:
the TO_counter corresponding to the active timestamp is decremented to 0;
a predetermined number of cache lines have been load-marked using a timestamp value; or
a predetermined time has passed since the first cache line was load-marked using the timestamp value.

7. The method of claim 1, wherein before storing to or placing a store-mark on a cache line, the method further comprises:
determining if the metadata for the cache line includes a load-mark, if the metadata for the cache line includes a timestamp, and if the TO_counter corresponding to the timestamp is non-zero; and
preventing the store to or the store-marking of a cache line if the metadata for a cache line includes a load-mark and a timestamp, and if the TO_counter corresponding to the timestamp is non-zero.

8. The method of claim 1, wherein a transaction includes the execution of a section of code, an atomic instruction, or an episode of hardware speculative-execution.

9. The method of claim 1, wherein the method further comprises allowing other threads to load from or load-mark a load-marked cache line.

10. An apparatus for marking cache lines, comprising:
a processor;
an execution mechanism on the processor, wherein the execution mechanism is configured to:
start a transaction for a thread, wherein starting the transaction involves recording the value of an active timestamp and incrementing a transaction or overflow counter (TO_counter) corresponding to the recorded value;
place load-marks on cache lines which are loaded during the transaction, wherein placing the load-marks involves writing the recorded value into metadata corresponding to the cache lines;
upon completing the transaction for the thread, the execution mechanism is configured to decrement the TO_counter corresponding to the recorded value and resume non-transactional execution for the thread without removing the load-marks from cache lines which were load-marked during the transaction; and
increment the value of the corresponding timestamp when the TO_counter is decremented to zero.

11. The apparatus of claim 10, wherein during the transaction for the thread the execution mechanism is configured to:
- start at least one additional transaction for at least one other thread, wherein starting the at least one additional transaction involves recording the value of an active timestamp and incrementing the TO_counter corresponding to the recorded value associated with the at least one additional transaction;
- place load-marks on cache lines which are loaded during the at least one additional transaction, wherein placing the load-marks involves writing the recorded value into metadata corresponding to the cache lines; and
- upon completing the at least one additional transaction, the execution mechanism is configured to decrement the TO_counter corresponding to the recorded value and resume non-transactional execution for the at least one other thread without removing the load-marks from cache lines which were load-marked during the at least one additional transaction.

12. The apparatus of claim 11, wherein during the transaction or the at least one additional transaction, upon evicting a first load-marked cache line to a next level of a memory hierarchy, the execution mechanism is configured to:
- record the value of an active timestamp for the next level of memory hierarchy;
- increment a TO_counter for the next level of the memory hierarchy corresponding to the recorded value of the active timestamp; and
- for the first load-marked cache line and any subsequent load-marked cache lines evicted to the next level of the memory hierarchy during the transaction or the at least one additional transaction, the execution mechanism is configured to place a load-mark on each evicted cache line at the next level of the memory hierarchy, wherein placing the load-mark involves writing the recorded value of the active timestamp into metadata associated with the cache line at the next level of the memory hierarchy.

13. The apparatus of claim 12, wherein upon evicting the first load-marked cache line, the execution mechanism is configured to:
- assert an overflow flag corresponding to the recorded value used to load-mark the evicted cache line;
- wherein when the transaction and the at least one additional transaction complete, if the overflow flag is set, the execution mechanism is configured to decrement the TO_counter at the next level of the memory hierarchy and resume non-transactional execution for the threads without removing the load-marks from cache lines which were load-marked at the next level of the memory hierarchy.

14. The apparatus of claim 12, wherein the execution mechanism is configured to:
- maintain a active timestamp and an inactive timestamp at each level of the memory hierarchy;
- record the value of the active timestamp as a transaction starts for a level of the memory hierarchy and use the recorded value of the active timestamp to load-mark cache lines during the transaction; and
- upon the occurrence of a predetermined condition at the corresponding level of the memory hierarchy, the execution mechanism is configured to switch the active timestamp to be inactive and the inactive timestamp to be active.

15. The apparatus of claim 14, wherein the execution mechanism is configured so that the predetermined condition includes:
- the TO_counter corresponding to the active timestamp is decremented to 0;
- a predetermined number of cache lines have been load-marked using a timestamp value; or
- a predetermined time has passed since the first cache line was load-marked using the timestamp value.

16. The apparatus of claim 10, wherein before storing to or placing a store-mark on a cache line, the execution mechanism is configured to:
- determine if the metadata for the cache line includes a load-mark, if the metadata for the cache line includes a timestamp, and if the TO_counter corresponding to the timestamp is non-zero; and
- prevent the store to or the store-marking of a cache line if the metadata for a cache line includes a load-mark and a timestamp, and if the TO_counter corresponding to the timestamp is non-zero.

17. The apparatus of claim 10, wherein the execution mechanism is configured so that a transaction includes the execution of a section of code, an atomic instruction, or an episode of hardware speculative-execution.

18. The apparatus of claim 10, wherein the execution mechanism is configured to allow other threads to load from or place load-marks on a load-marked cache line.

19. A computer system for marking cache lines, comprising:
- a processor;
- a memory coupled to the processor, wherein the memory stores instructions and data for the processor;
- an execution mechanism on the processor, wherein the execution mechanism is configured to:
  - start a transaction for a thread, wherein starting the transaction involves recording the value of an active timestamp and incrementing a transaction or overflow counter (TO_counter) corresponding to the recorded value;
  - place load-marks on cache lines which are loaded during the transaction, wherein placing the load-marks involves writing the recorded value into metadata corresponding to the cache lines;
  - upon completing the transaction for the thread, the execution mechanism is configured to decrement the TO_counter corresponding to the recorded value and resume non-transactional execution for the thread without removing the load-marks from cache lines which were load-marked during the transaction; and
  - increment the value of the corresponding timestamp when the TO_counter is decremented to zero.

* * * * *